US005715400A

United States Patent [19]
Reimer et al.

[11] Patent Number: 5,715,400
[45] Date of Patent: *Feb. 3, 1998

[54] SYSTEM AND METHOD FOR PROVIDING MERCHANT INFORMATION AND ESTABLISHING LINKS TO MERCHANTS WHILE PRESENTING A MOVIE

[75] Inventors: James A. Reimer, Morgan Hill; Roger A. Reinsch, Cupertino, both of Calif.

[73] Assignee: International Business Machines Corporation, Armonk, N.Y.

[*] Notice: The term of this patent shall not extend beyond the expiration date of Pat. No. 5,696,905.

[21] Appl. No.: 457,782

[22] Filed: Jun. 1, 1995

Related U.S. Application Data

[62] Division of Ser. No. 407,307, Mar. 20, 1995.

[51] Int. Cl.$^6$ .................................................. G06F 17/60
[52] U.S. Cl. ................................................ 395/227; 348/13
[58] Field of Search ............................ 364/401 R; 348/6, 348/10, 12, 13; 395/201, 226, 227

[56] References Cited

U.S. PATENT DOCUMENTS

| | | | |
|---|---|---|---|
| 4,305,131 | 12/1981 | Best | 364/521 |
| 4,931,950 | 6/1990 | Isle et al. | 364/513 |
| 5,053,956 | 10/1991 | Donald | 364/401 |
| 5,111,409 | 5/1992 | Gasper et al. | 395/152 |
| 5,231,566 | 7/1993 | Blutinger | 364/401 |
| 5,307,456 | 4/1994 | MacKay | 395/154 |
| 5,309,355 | 5/1994 | Lockwood | 364/401 |
| 5,319,455 | 6/1994 | Hoarty et al. | 348/7 |
| 5,345,549 | 9/1994 | Appel et al. | 395/154 |
| 5,353,391 | 10/1994 | Cohen et al. | 395/125 |
| 5,367,621 | 11/1994 | Cohen et al. | 395/154 |
| 5,388,993 | 2/1995 | McKiel et al. | 434/118 |
| 5,404,316 | 4/1995 | Klingler et al. | 395/161 |
| 5,414,808 | 5/1995 | Williams | 395/154 |

(List continued on next page.)

OTHER PUBLICATIONS

Cowart, Robert, "Master Windows ® 3.1", SYBEX, 1992, p. 31.
Ozer, "Digital Video: Shot by Shot", *PC Magazine*, vol. 14, No. 7, Apr. 11, 1995, pp. 104–110.
Sahai, "Video Thrills for Digital De Milles: Adobe Premiere 4.0", *Windows Magazine*, vol. 6, No. 1, Jan. 1, 1995, p. 140 (abstract only).
Simone, "Video–Editing Software: Digital Master", *PC Magazine*, vol. 14, No. 7, Apr. 11, 1995, pp. 144–145.
Multimedia Scouting, IEEE Computer Graphics and Applications, p. 26, Jul. 1991.
The Bard of CD-ROM, Charles Boisseau, Houston Chronicle, Oct. 5, 1992.

*Primary Examiner*—Gail O. Hayes
*Assistant Examiner*—Steven R. Yount
*Attorney, Agent, or Firm*—Marilyn Smith-Dawkins; Sterne, Kessler, Goldstein & Fox PLLC

[57] ABSTRACT

A system and method for providing on demand access to information related to a movie while the movie is being presented to a user, where the movie was generated from the movie related information, are described. The system operates by presenting the movie to the user, and then receiving from the user a query pertaining to the movie. The system determines a frame of the movie that was being presented to the user when the user issued the query (the system may extract this information from the query, or may extract this information from the movie itself). The system identifies, as specified by the query, portions of the movie related information relating to the frame, and retrieves those portions of the movie related information. These retrieved portions of said movie related information are presented to the user. Also discussed is a manager to enable users to create personalized versions of movies, and personalized collections of items. Also discussed is a system and method for providing to users on demand access to merchandise information related to a movie, and for providing on demand connectivity to merchants, while the movie is being presented to the users.

38 Claims, 18 Drawing Sheets

U.S. PATENT DOCUMENTS

| | | | |
|---|---|---|---|
| 5,440,678 | 8/1995 | Eisen et al. | 395/154 |
| 5,451,998 | 9/1995 | Hamrick | 348/13 |
| 5,485,611 | 1/1996 | Astle | 395/600 |
| 5,515,490 | 5/1996 | Buchanan et al. | 395/154 |
| 5,539,450 | 7/1996 | Handleman | 348/12 |
| 5,583,560 | 12/1996 | Florin et al. | 348/7 |

FIG. 8

| TYPE CODE 804 | FIRST FRAME TIME CODE 806 | LAST FRAME TIME CODE 808 | FRAME COUNT 810 | SOURCE FIRST FRAME TIME CODE 812 | SOURCE FRAME COUNT 814 | SOURCE TITLE 816 | FOR WHICH SCENE 818 |
|---|---|---|---|---|---|---|---|
| SCENE | | | | N/A | N/A | N/A | |
| CLIP | | | | | | | N/A |
| MASTER TAKE | | | | | | | |
| CLOSE UP TAKE | | | | | | | |
| EXTREME CLOSE UP TAKE | | | | | | | |
| ... | | | | | | | |

SOURCE TABLE 802

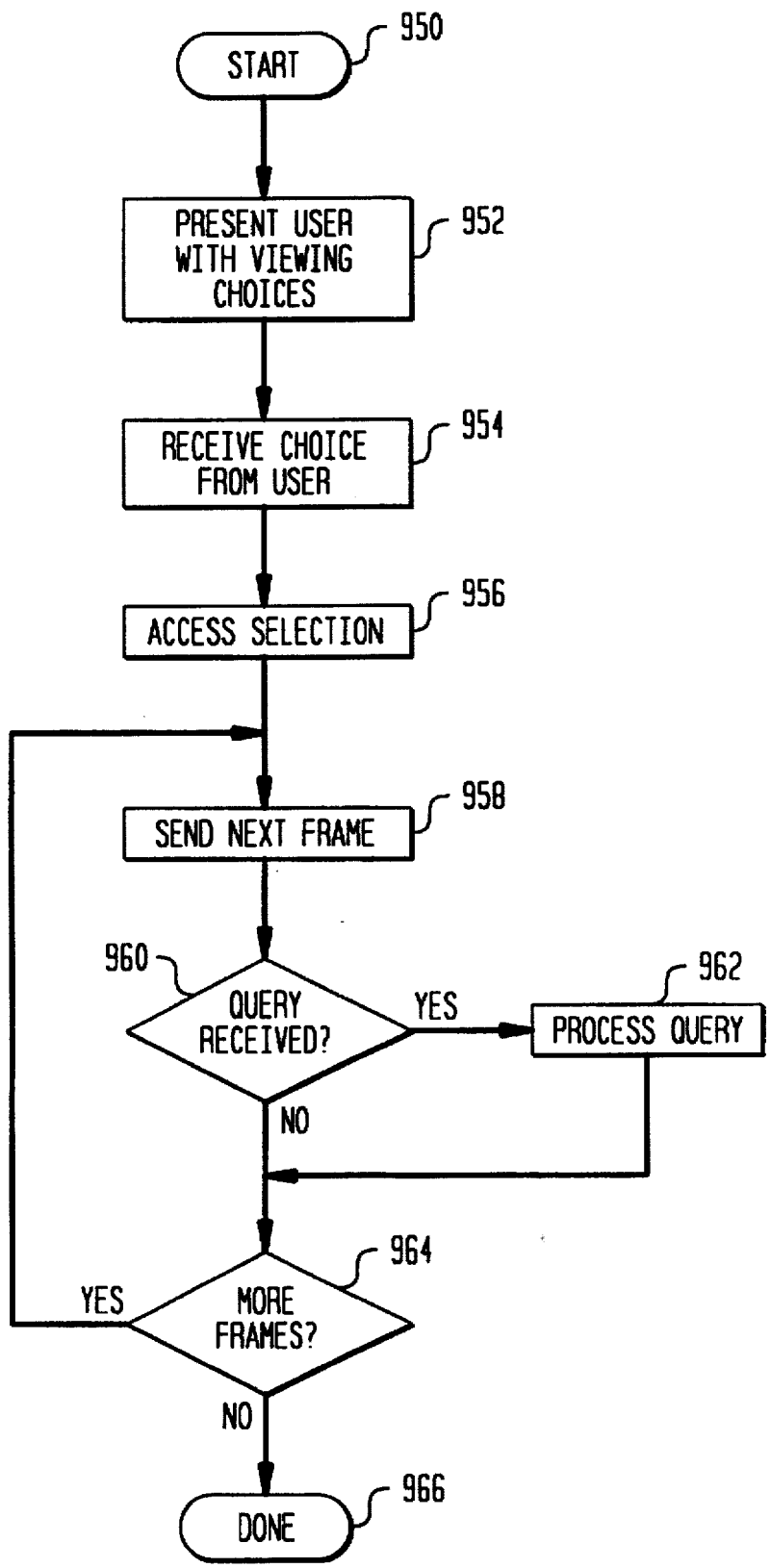

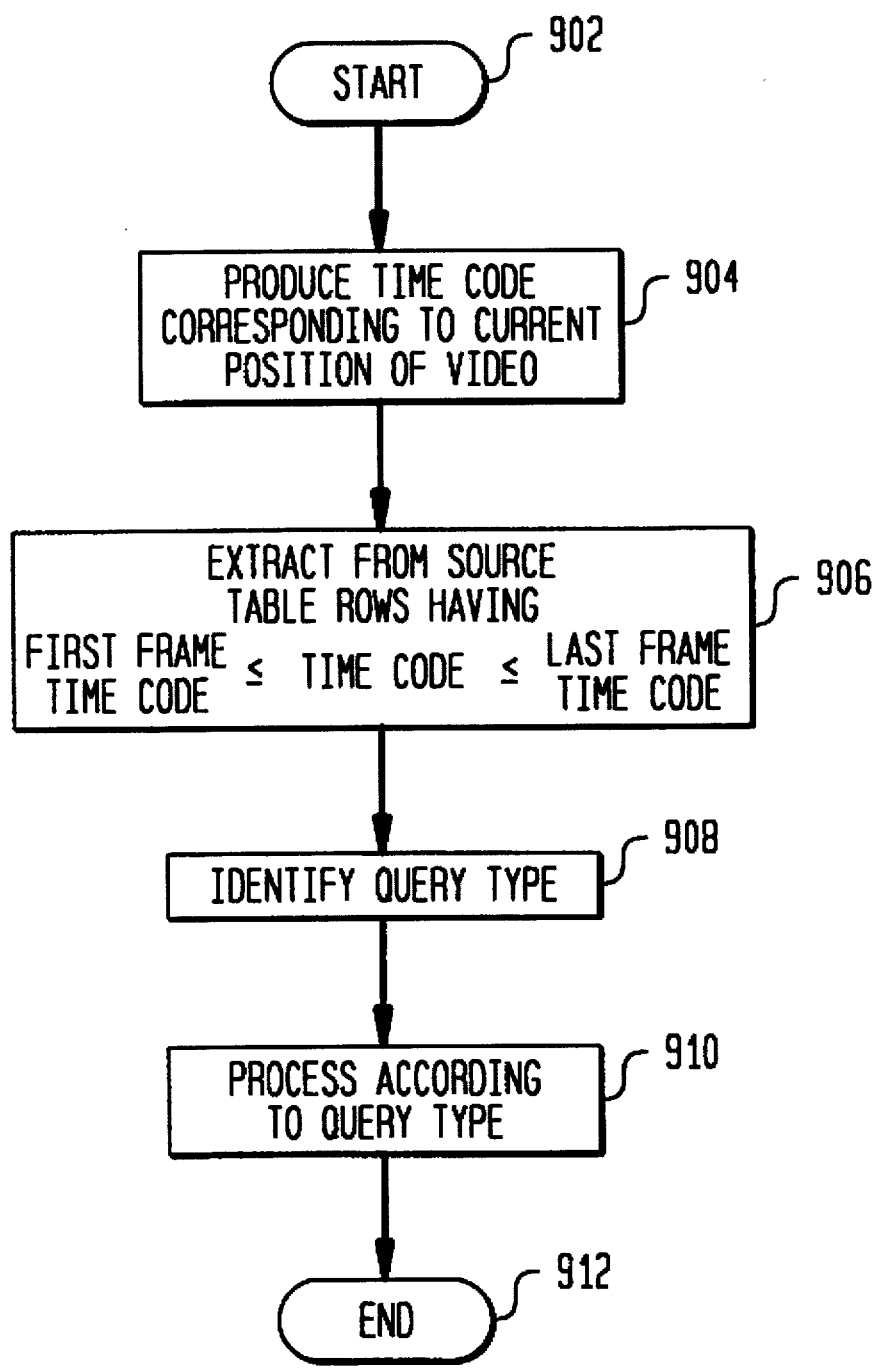

FIG. 10A

ACTOR IN TAKE TABLE 1002

| ACTOR | TAKE TITLE | START TIME CODE | END TIME CODE |
|---|---|---|---|
| JOHN SMITH | CLOSE UP OF SMITH | 0607 | 0658 |

Columns: 1004, 1006, 1008, 1010

FIG. 10B

CHARACTER IN SCENE TABLE 1012

| SCENE | CHARACTER |
|---|---|
| FINAL BATTLE | HERCULES |

Columns: 1014, 1016

FIG. 10C

ACTOR PLAYS CHARACTER TABLE 1018

| CHARACTER | ACTOR | CODE |
|---|---|---|
| HERCULES | JOHN SMITH | PRINCIPLE |
| HERCULES | JOE DAVIS | STUNT DOUBLE |

Columns: 1020, 1022, 1024

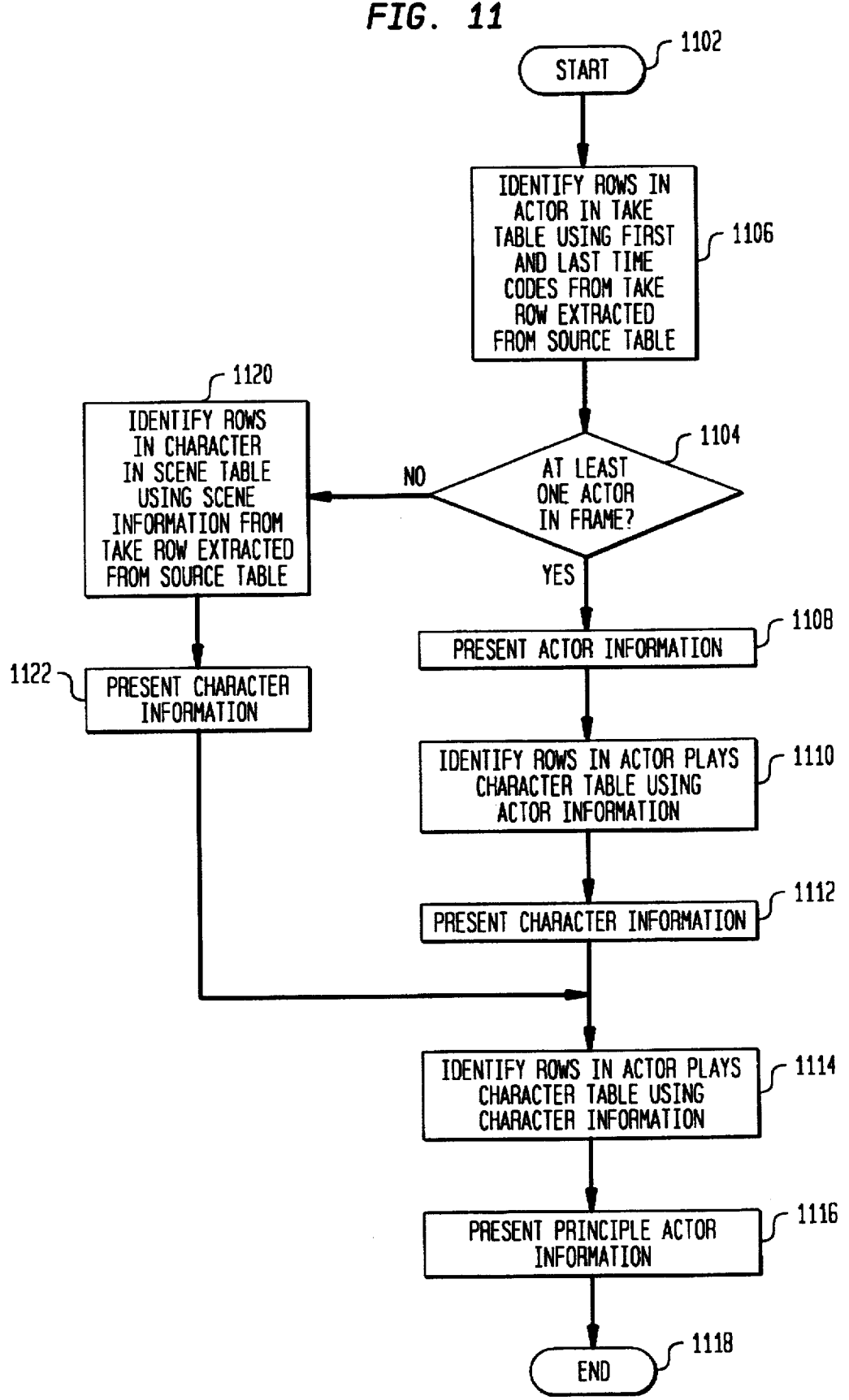

FIG. 12A

ONE MOVIE CREDIT TABLE 1202

| PERSON (1204) | JOB (1206) |
|---|---|
| JOHN | DIRECTOR |
| MARY | CASTING DIRECTOR |
| SUSAN | ACTRESS |
| MIKE | ACTOR |

FIG. 12B

ALL MOVIES CREDIT TABLE 1208

| TABLE IDENTIFIER (1210) | MOVIE TITLE (1212) | PERSON (1214) | JOB (1216) |
|---|---|---|---|
|  | MOVIE A | JOHN | DIRECTOR |
|  | MOVIE B | JOHN | ACTOR |
|  | MOVIE A | MARY | CASTING DIRECTOR |
|  | MOVIE A | SUSAN | ACTRESS |

FIG. 13A

TIME IN STORY TABLE 1302

| SCENE (1304) | TIME SINCE STORY START (1306) | TIME SINCE LAST SCENE (1308) | ABSOLUTE DATE/TIME (1310) |
|---|---|---|---|
|  |  |  |  |

FIG. 13B

TAKE DETAILS TABLE 1312

| TAKE TITLE (1314) | TAKE FIRST FRAME TIME CODE (1316) | LOCATION NAME (1318) | DATE SHOT (CREATED) (1320) | TIME SHOT (CREATED) (1322) | METHOD (1324) |
|---|---|---|---|---|---|
|  |  |  |  |  |  |

QUESTION/ANSWER TABLE 1404

| QUESTION NUMBER 1406 | QUESTION 1408 | ANSWER 1410 |
|---|---|---|
| | | |

QUESTION APPLIES TO SCENE TABLE 1424

| QUESTION NUMBER 1426 | FIRST SCENE 1428 | LAST SCENE 1430 |
|---|---|---|
| | | |

START 1510
↓
DETERMINE CURRENT SCENE 1520
↓
EXTRACT RELEVANT QUESTIONS 1522
↓
PRESENT MENU OF "WHY" QUESTIONS 1512
↓
RECEIVER QUESTION IDENTIFIER FROM USER 1514
↓
PRESENT ANSWER 1516
↓
DONE 1518

| 1704 | 1706 | 1708 | 1710 | 1712 | 1714 |
|---|---|---|---|---|---|
| FIRST FRAME TIME CODE | LAST FRAME TIME CODE | SOURCE FIRST FRAME TIME CODE | SOURCE FRAME COUNT | SOURCE TITLE | FOR WHICH SCENE |
|  |  |  |  |  |  |

MERCHANDISE TABLE 2202

| SCENE (2204) | FURNITURE (2206) | COSTUMES (2208) | LOCATION (2210) | MUSIC (2212) | FOOD (2214) |
|---|---|---|---|---|---|
| XYZ | SOFA | JACKET SUIT | GRAND CANYON | SOUNDTRACK BY ABC | SOFT DRINK |

FIG. 22B

COSTUMES MERCHANDISE TABLE 2216

| SHOES (2218) | DRESS (2220) | SUIT (2222) | HAT (2224) | BELT (2226) | JACKET (2228) |
|---|---|---|---|---|---|
| | | MERCHANT A MERCHANT C | | | MERCHANT A MERCHANT B |

SYSTEM AND METHOD FOR PROVIDING MERCHANT INFORMATION AND ESTABLISHING LINKS TO MERCHANTS WHILE PRESENTING A MOVIE

This application is a division of application Ser. No. 08/407,307, filed Mar. 20, 1995, (status: pending).

CROSS-REFERENCE TO OTHER APPLICATIONS

The following applications of common assignee contain some common disclosure, and are believed to have an effective filing date identical with that of the present application.

"System and Method for Linking and Presenting Movies With Their Underlying Source Information," Attorney Docket No. ST9-94-044 (1252.1900000) Ser. No. 08/407,306 now U.S. Pat. No. 5,596,705, incorporated herein by reference.

"System and Method for Enabling the Creation of Personalized Movie Presentations and Personalized Movie Collections," Attorney Docket No. ST9-94-045 (1252.1910000) Ser. No. 08/407,305 now abandoned, incorporated herein by reference.

DESCRIPTION

1. Technical Field

The present invention relates generally to data linking and presentation, and more particularly to linking and presenting movies with their underlying source information.

2. Related Art

The Information Age that currently exists has produced incredible amounts of data that are currently unavailable to the public. In many cases, the producers of such information would be more than willing to provide the information to the public for some reasonable fee, and the public would be willing to pay this fee. Typically, however, these information producers (also called information providers) are not able to take advantage of this significant business opportunity due to the problems inherent in providing the information to the public.

One problem relates to the medium in which the information is stored. Today, information is stored on paper, on film, on video, on compact disks, on magnetic tapes, on computer floppy disks, etc. Information related to a particular topic may be stored on any combination of these storage mediums. In order to provide information on that topic to an user, it would be necessary for an information provider to identify and locate all items containing information related to the topic, and then transport these items to the user. The value of these items to the user is questionable, since the user probably does not possess the equipment needed to access the information stored in all of the items. Accordingly, it is difficult to provide information to users because such information is stored in many different storage mediums.

A more significant problem results from the sheer volume of information relating to any particular topic. Such information is of little value to an user unless the user is able to efficiently and expeditiously make use of the information. For example, suppose that the user is reviewing a document written by an author and decides that it would be interesting to study other works the author has had a part in creating. The information provided to the user from the information provider will be of little value unless the user is able to efficiently, effectively, and expeditiously traverse the information and locate the data on the author of interest.

These above-described commercial opportunities associated with the dissemination of information, and the problems that prevent such commercial opportunities from being realized, shall now be described more concretely by considering a real-life example: the motion picture industry.

Viewing a movie via a theatrical presentation today involves travelling to the theater, waiting in line to buy a ticket, choosing a seat, and waiting for the movie to begin. The viewer's schedule must match that of the theater. Once the movie has started, the viewer must watch promotional previews of other films before watching the feature film. During the presentation, the viewer has no control over the sound volume or presentation flow. When the movie is over, the viewer travels back home. The picture quality and sound are excellent, and the viewer enjoys the best viewing experience possible today. However, these benefits are obtained only at the expense of convenience and viewing control. Thus, commercial opportunities exist in electronically transferring movies to viewer's homes.

The technology to electronically transfer movies to viewer's homes exists today. Viewing a movie over a conventional network or premium channel broadcast is simpler and more convenient, but the viewer has fewer movie choices and enjoys a more limited quality experience. Like a theatrical viewing, the viewer's schedule must match that of the broadcast and the viewer does not control the presentation flow. There is no travelling involved, and the cost is generally less than that of a theater experience. The video and audio quality are dependent on the viewer's television and sound system. Note that, with this viewing option (and also with the theatrical presentation option discussed above), the viewer is typically not provided with any supplemental information about the movie, such as information about the making of the movie, interviews with the director and cast members, information on the actors, information about special effects, etc.

Alternatively, a person can watch a movie by renting a video tape or laser disk. Watching a movie in this manner involves two trips to the rental shop, a search of their available titles, a wait in line, and a rental fee. The viewing experience is improved over that of a broadcast presentation, as the viewer has some presentation controls (pause, fast forward, rewind, etc.). A laser disk may also offer supplemental information about the film. Parallel audio tracks may be included containing, for example, director commentary. Separate chapters of video may also be provided. However, there is no ability to play video content from different chapters simultaneously. The cost is generally higher than that of a network broadcast. Cost comparisons to that of a premium channel are dependent on usage patterns (flat fee versus fee per rental).

A mid-90s 'near video on demand' viewing experience represents something between that of broadcast movies and a VCR/laser disk. A viewer selects a movie from an expanded broadcast rotation (generally a much smaller collection than that available at a VCR rental outlet). The viewer must wait a few minutes until the next rotation of the movie broadcast. A purchase request via remote control or an 800 number is required to enable viewing. Once the presentation has begun, the viewer has a limited range of controls over the presentation flow. If the movie is paused, the viewer must wait until the next instance of the movie at that point is available in the rotation. This latency is dependent on the number of channels available and the collection size configured by the viewer's cable carrier, and is typically about five minutes. No travel is required, and the per use fee is typically added to the viewer's monthly cable bill. Supplemental information about the movie is typically not available.

A mid-90s 'true video on demand' viewing experience is effectively like that of a VCR rental, without two trips to the rental outlet. A digital movie server and ITV infrastructure are used to enable the viewer to select a movie from a large collection of all digitized films available on the server. The available selection list is not restricted by a broadcast rotation, and each viewer has full and immediate control over their movie presentation. Like 'near video on demand,' a purchase request via remote control or an 800 number is required to enable viewing. The per use fee is typically added to the viewer's monthly bill, and supplemental information is typically not available.

Thus, the current options for viewing a movie are limited because they are inconvenient (the viewer must travel to the theater or to the video store), and/or provide the viewer with little or no presentation flow. Also, these current viewing options are limited because they provide the viewer with little or no supplemental movie information. Thus, the motion picture industry is not taking advantage of the potential commercial opportunities associated with providing supplemental movie information to viewers. Even in those cases where supplemental information is provided, the viewer has little control over how such supplemental information is presented. Accordingly, the supplemental information is available only in a limited way to videophiles who are willing to pay extra for "special" or "director's cut" editions of the titles.

DISCLOSURE OF INVENTION

The present invention is directed to a system and method for providing on demand access to information related to a movie while the movie is being presented to a user, where the movie was generated from the movie related information. The invention operates by presenting the movie to the user, and then receiving from the user a query pertaining to the movie. The invention determines a frame of the movie that was being presented to the user when the user issued the query (the invention may extract this information from the query, or may extract this information from the movie itself). The invention identifies, as specified by the query, portions of the movie related information relating to the frame, and retrieves those portions of the movie related information. These retrieved portions of the movie related information are presented to the user.

The present invention is also directed to a system and method for enabling a user to create, modify, and utilize a personalized version of a movie. The system includes a foundation information database which stores movie related information used to generate the movie. This embodiment of the invention operates by enabling the user to modify a copy of an edit decision list associated with the movie. The edit decision list includes an entry for each scene, clip, and take in the movie. The modified edit decision list defines the personalized version of the movie. The personalized version of the movie is presented to the user in response to a request to do so from the user. Such presentation operates by retrieving an entry from the modified edit decision list, retrieving from the foundation information database one or more digitized frames specified by the retrieved entry, and presenting the digitized frames to the user.

In a similar manner, the present invention is directed to a system and method for enabling a user to create, modify, and utilize a personalized collection of items. This embodiment of the invention operates by enabling the user to modify a personalized collection table, where the personalized collection table defines the personalized collection and has an entry for each item in the personalized collection. The personalized collection of items is presented to the user in response to a request to do so from the user. Such presentation operates by retrieving an entry from the personalized collection table, retrieving from the foundation information database foundation information specified by the retrieved entry, and presenting the retrieved foundation information to the user. The items contained in the personalized collection include any combination of shots, takes, scenes, clips, audio segments, etc.

Further, the present invention is directed to a system and method for providing on demand access to merchandise information related to a movie, and for providing on demand connectivity to merchants, while the movie is being presented to a user. This embodiment of the invention operates by presenting the movie to the user, receiving from the user a merchandise related query pertaining to the movie, and determining a scene of the movie that was being presented to the user when the user issued the query. Portions of movie related information relating to merchandise appearing in the scene are identified and retrieved. These portions of movie related information are then presented to the user. The invention enables the user to interact with any merchant who provided any merchandise appearing in the scene in response to a request from the user to do so.

Further features and advantages of the present invention, as well as the structure and operation of various embodiments of the present invention, are described in detail below with reference to the accompanying drawings. In the drawings, like reference numbers indicate identical or functionally similar elements.

The foregoing and other objects, features and advantages of the invention will be apparent from the following more particular description of (a) preferred embodiment(s) of the invention, as illustrated in the accompanying drawing(s).

BRIEF DESCRIPTION OF FIGURES

The present invention will be described with reference to the accompanying drawings, wherein:

FIG. 8 illustrates an example source table;

FIGS. 9A, 9B, 11, 15, 17A, 18, 19, and 21 are flowcharts depicting the operation of the present invention;

FIGS. 10A–10C, 12A, 12B, 13A, 13B, 14A, 14B, 17B, 20, 22A, and 22B are example index tables.

BEST MODE FOR CARRYING OUT THE INVENTION

Figure 1:
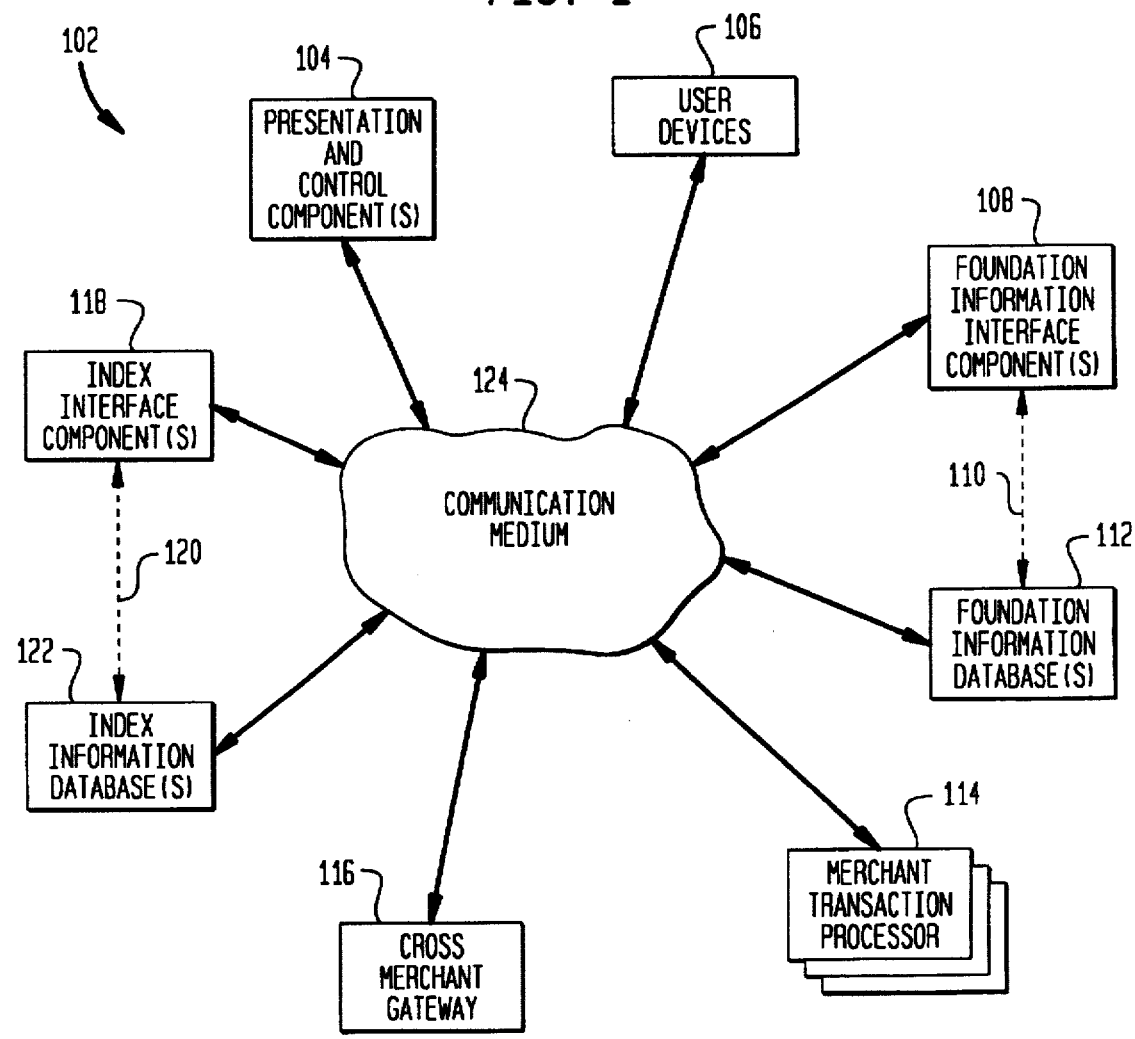
FIG. 1 is a block diagram of a preferred embodiment of the present invention.

The present invention is directed to a system and method for organizing information, and for providing services to enable users to efficiently, effectively, and expeditiously access such information. In other words, the present invention provides services to enable users to access information in an intelligent, user-driven manner.

For illustrative purposes, the present invention is sometimes described herein in the context of information produced by the motion picture industry. That is, the present invention is described as a system and method for organizing movie and supplemental movie information, and for presenting such movie and supplemental movie information to users. It should be understood, however, that the present invention is not limited to this embodiment (call the "movie environment" for reference purposes). Instead, the present invention is applicable to any environment where information is produced, and where a commercial opportunity exists with the organization and presentation of such information. For example, the present invention is applicable to computer programming environment where information about the person who wrote a program, the company that sold the program, the place the program was written and tested, etc., could be linked to a running program.

The movie embodiment of the present invention is preferably realized through a combination of a 'true video on demand' infrastructure, database technology, and other specialized digital servers. By tightly coupling databases to specialized digital servers for video, audio, still image, text, etc., a novel level of control of movie presentation is achieved. Additional information about a movie is stored and managed, to permit a viewer to more effectively explore and understand movies. The combination of greater control and additional information permits the viewer to experience a new level of richness and entertainment from movies.

Accordingly to the movie embodiment, text, still image, and audio information is directly related to specific movie scenes or frames. This level of association, coupled with a database, permits a greater level of direct access to movie information than previously possible. Searching and correlation of supplemental information (also called side information) permits the examination of different side information relationships, and permits the following sample actions not existing in conventional viewing technologies:

1. List the names of the actors, other credited roles, or scene technical detail for the current scene (e.g., director, producer, musical score, shot location, blue screen, matte, etc.).
2. List other movies, TV shows, or other scenes in the current movie with one or more properties equal to those found above.
3. List all scenes including a specific product tie-in (i.e., product brand name used in movie).
4. Save any of these lists for viewing selection.
5. View scene while listening to voice overs of director or actor with their comments about the scene.
6. View stills with pan and zoom controls, to examine fine detail.
7. View movie at desired censor level.
8. View script or staging information via picture in picture.
9. View outtakes for the current scene.
10. View signing (i.e., sign language) via picture in picture.
11. Search other stills for like colors, shapes, or textures.
12. Search the script for a word or phase.
13. Search other scripts for like words or phrases.
14. Layout a movie presentation box, with areas for displaying related information of interest.
15. View a movie through a presentation box, to concurrently view the movie and related information of interest.

In addition to these queries predominately based on script and editing linkages, queries can be made on non-text factors. Metrics extracted from the video, audio, or stills are also managed by the database, and are used to form non-text searches against these data. This scheme can be used to search for non-text aspects such as cut boundaries and movies having similar soundtracks.

The movie embodiment of the present invention also permits the examination of movie detail beyond that viewable through a TV or HDTV. Feature films are today captured principally on high grade film, affording fidelity far beyond that viewable on TV or HDTV. The present invention permits a viewer to pan and zoom, to examine finer detail in a movie or image still.

By using the movie embodiment of the present invention, film makers are afforded a new level of flexibility in optional viewing and associations from within their films. Alternate plot lines, cuts, or censor levels are much more easily constructed, because the film components are manipulated independently. Composition is directed through the database, easing the construction of alternate presentations and linkages.

Structure of the Present Invention

The present invention shall now be discussed more generally with reference to FIG. 1, which illustrates a block diagram of a data processing environment 102 of the present invention. This environment 102 includes a plurality of user devices 106 representing, for example, set top boxes (STB) in combination with television monitors, or computers (such as personal computers). The user devices 106 each include a mechanism (such as a keyboard either integrated into the user devices 106 or contained in a remote control unit) for receiving control and information messages from human operators.

Each user device 106 also includes a well known transmit and receive component to transmit and receive control and information signals from other devices via a communication medium 124. Preferably, the communication medium 124 represents a data communication network, such as a local area network or a wide area network, in which case the environment 102 represents a distributed computing environment. However, the present invention is not limited to this connection scheme. For example, some of the devices shown in FIG. 1 may be positioned locally to each other, and/or some of the devices in FIG. 1 may be implemented using a single computer. In sum, any mechanism or scheme for connecting the devices shown in FIG. 1 is within the scope and spirit of the present invention.

The environment 102 also includes a foundation information interface component 108 that controls access to foundation information in a foundation information database 112. (As shown by line 110, the foundation information interface component 108 is preferably directly connected to the foundation information database 112.) The term "foundation information" is used herein to refer to information that has been produced by one or more parties (each party being a person or organization). According to the present invention, the foundation information represents digital information only. The present invention provides foundation information on demand to users via the user devices 106. With respect to the movie embodiment, the foundation information represents, for example, a movie and supplemental information pertaining to the movie (i.e., additional information generated during the pre-production, production, and post-production stages of the movie). The foundation information is described in greater detail below.

Preferably, the foundation interface component 108 represents a relational database management system (RDBMS).

The foundation information database 112 preferably represents a file server. The foundation information database 112 may be distributed for performance reasons (i.e., to position foundation information closer to the user devices 106 so that communication performance is enhanced), in which case there would be multiple foundation information interface components 108 and multiple foundation information databases 112 (for simplicity purposes, only one foundation information interface component 108 and one foundation information database 112 are described).

An index interface component 118 controls access to index information in an index information database 122. (As shown by line 120, the index interface component 118 is preferably directly connected to the index information database 122.) This index information represents indices of the foundation information in the foundation information database 112. Accordingly, the organization of the foundation information is established by the index information. The present invention uses the index information to locate and reference particular foundation information. The index information is discussed further below.

Preferably, the index interface component 118 represents a relational database management system (RDBMS). The index information database 122 preferably represents a file server which has special searching capabilities or another relational database management system (RDBMS). The index information 122 may be distributed for performance reasons, in which case there would be multiple index interface components 118 and multiple index information databases 122 (for simplicity purposes, only one index interface component 118 and one index information database 122 are described).

The environment 102 further includes a presentation and control component 104. The functionality of the presentation and control component 104 may be distributed, in which case there would be multiple presentation and control components 104. For simplicity purposes, only one presentation and control component 104 is discussed. The presentation and control component 104 coordinates the actions of the user devices 106, the foundation information interface component 108, and the index interface component 118.

In particular, the presentation and control component 104 receives information requests from the user devices 106. The presentation and control component 104 processes these information requests by accessing the index information in the index information database 122 (via the index interface component 118) to identify and locate the particular foundation information indicated by the user requests. The presentation and control component 104 then retrieves this foundation information from the foundation information database 112 (via the foundation information interface component 108), and presents this foundation information to the users via the user devices 106. In an alternative embodiment, any or all of the functionality of the presentation and control component 104 is embedded in the index interface component 118 and/or the foundation information interface component 108, such that the user devices 106 (in some circumstances) communicate directly with the index interface component 118 and/or the foundation information interface component 108.

In an embodiment of the present invention, the user devices 106 are each used as the application driver in a client/server model, and makes server requests of the databases 112, 122 and digital servers through the index interface component 118 and the foundation information interface component 108 through an integrated interface. The functionality of this integrated interface is represented by the presentation and control component 104, although such functionality can alternatively be located or distributed among other modules. Through these interfaces, the digital video, audio, and still image objects stored on the digital server(s) appear to the application to be managed as data in the relational databases 108, 118.

The index information database 122 and the foundation information database 112 are preferably implemented as digital servers for at least two reasons:

1. To permit the use of specialized hardware and software to cost-effectively deliver the digital video, audio, and image stills.
2. To permit the distribution of these servers, thereby reducing the distance to the viewer and the associated latency and transmission costs.

As noted above, each user device 106 can be a full function PC, or a more limited function settop box. Depending on the hardware and software capacity of any particular user device 106, the client application executing thereon may be distributed over the user device 106 and an intermediate station emulating a full function end station. Independent of this distribution of function, the user device/intermediate station interacts with both the relational databases 112, 122 and the digital movie servers 108, 118 through the integrated interface (i.e., the presentation and control component 104).

The environment 102 also includes a cross merchant gateway 116 and a merchant transaction processor 114, which are described below.

Figure 2:
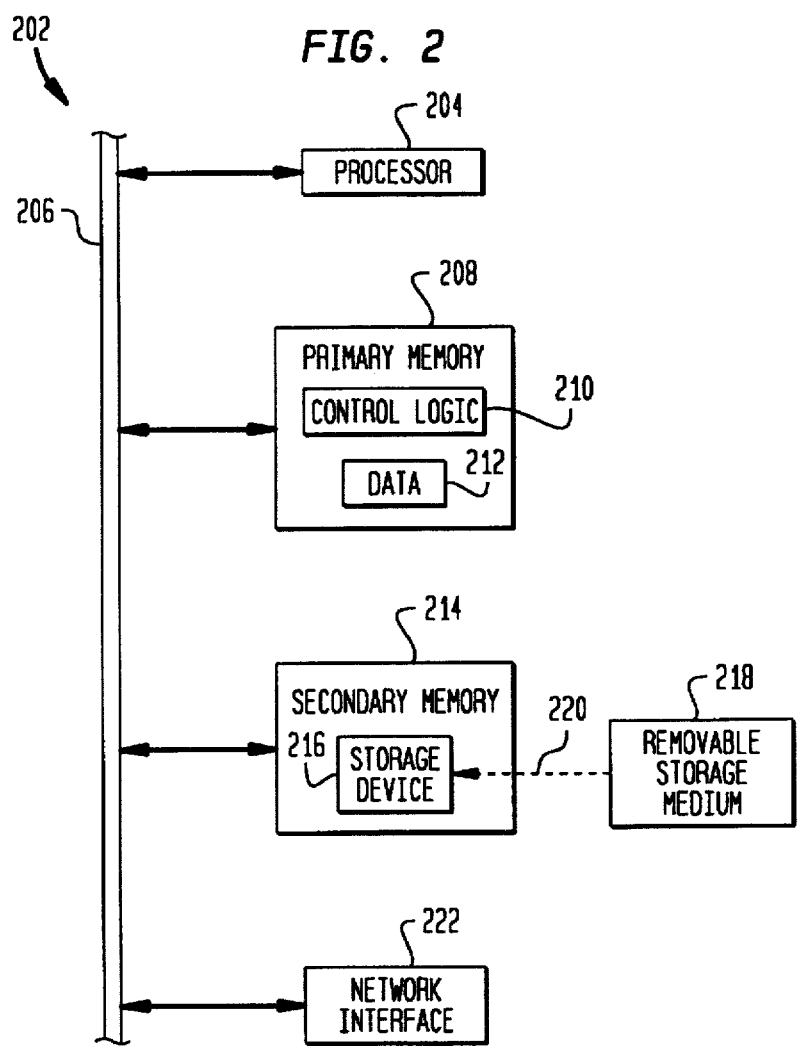
FIG. 2 is a block diagram of a computer system representing a preferred implementation of many components of the present invention.

The user devices 106, foundation information interface component 108, index interface component 118, presentation and control component 104, foundation information database 112, index information database 122, cross merchant gateway 116, and merchant transaction processor 114 are each preferably implemented using a computer system 202 as shown in FIG. 2. (Alternatively, each computer system 202 is used to implement a subset of these devices/components.) The computer system 202 includes a processor 204 (or multiple processors 204) communicating with other components via a communication bus 206.

Connected to the bus 206 is a primary memory 208 (such as random access memory, RAM) which stores control logic 210 (i.e., software) and data 212 (such as a portion of the foundation information and index information, for example). During run-time, the control logic 210 enables the processor 204 to perform the functions described herein. Thus, the control logic 210 represents a controller of the processor 204. In an alternate embodiment, the functionality of the present invention described herein is achieved using a hardware implemented state machine.

The computer system 202 also includes secondary memory 214, which may include a storage device 216, such as a removable disk drive (i.e., a floppy drive). A removable storage medium 218, such as a computer disk (i.e., a floppy disk) can be inserted in the storage device 216. The control logic 210 is stored in direct computer readable form (i.e., magnetically or optically) on a storage medium (i.e., magnetic storage medium) in the removable storage medium 218.

Also connected to the bus 206 is a network interface 222, which provides connectivity to the communication medium 124 shown in FIG. 1.

Source, Foundation, and Index Information

Figure 16:
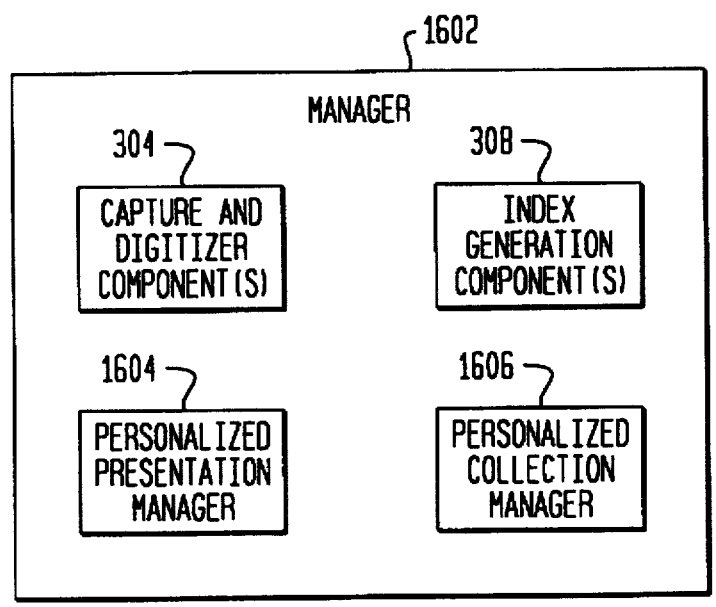
FIG. 16 is a block diagram of a manager according to a preferred embodiment of the present invention.
Figure 17A:
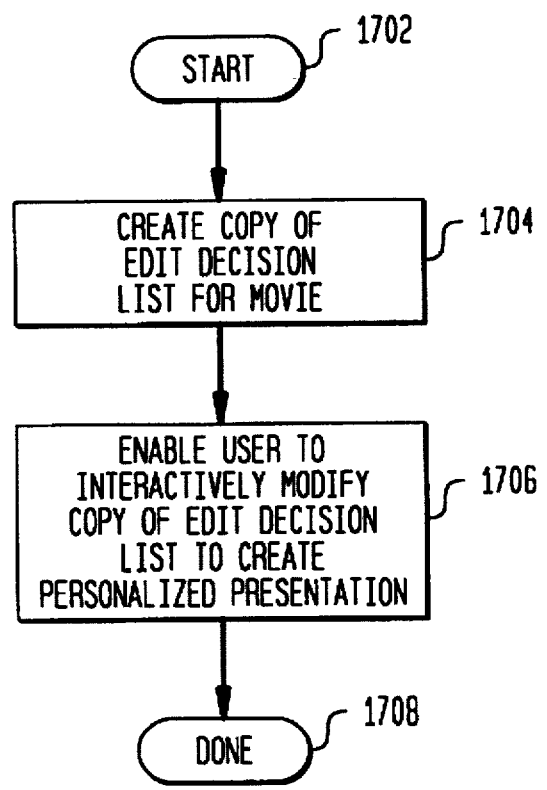
Figures 17B, 18:
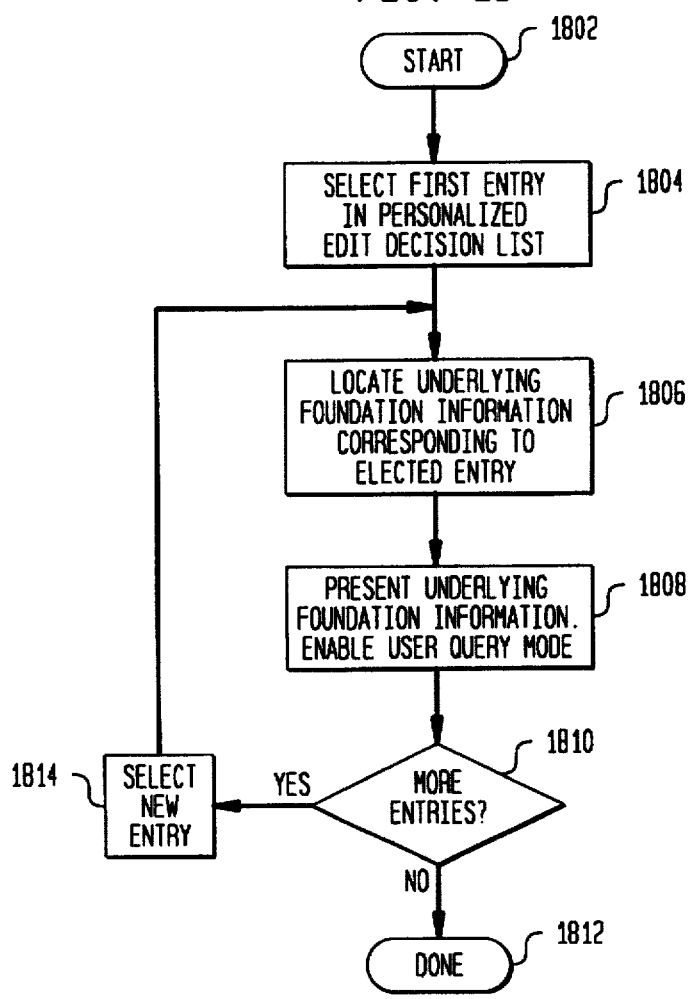
Figure 19:
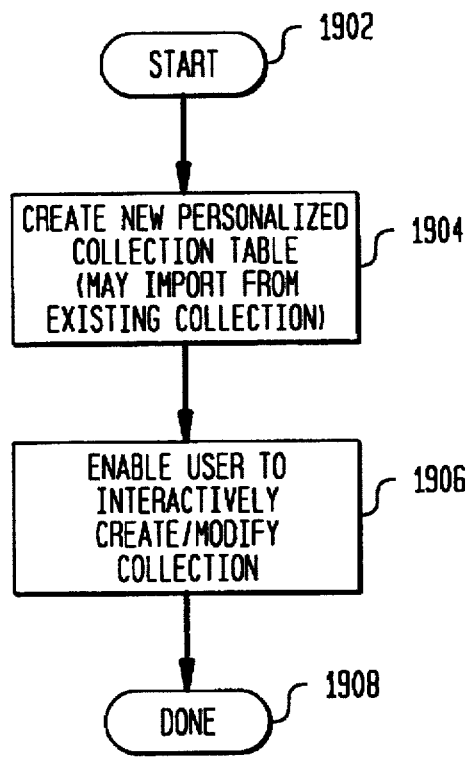
Figure 20:
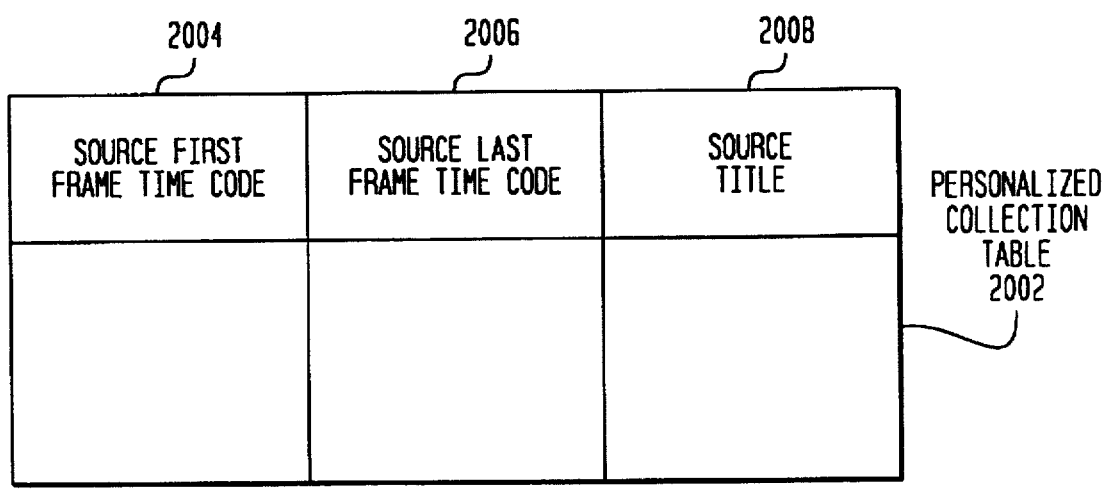

The present invention also includes a manager 1602 which is shown in block diagram form in FIG. 16. The manager 1602 includes one or more capture and digitizer components 304 (for simplicity purposes, only one is described), one or more index generation components 308 (for simplicity purposes, only one is described), a personalized presentation manager 1604, and a personalized collection manager 1606. The manager 1602 and its components 304, 308, 1604, 1606 are preferably implemented using one or more computer-based devices operating in accordance with instructions from computer software (as shown in FIG. 2). Alternatively, the functionality of at least portions of the manager 1602 (as described herein) is achieved using predominately hardware, such as a hardware implemented state machine.

The personalized presentation manager 1604 and the personalized collection manager 1606 are discussed in U.S. patent application entitled "System and Method for Enabling the Creation of Personalized Movie Presentations and Personalized Movie Collections," Attorney Docket No. ST9-94-045 (1252.1910000) Ser. No. 08/407,305 now abandoned, referenced above. The capture and digitizer component 304 and the index generation component 308 shall now be described.

The capture and digitizer component 304 and the index generation component 308 are used to generate the foundation information that is ultimately stored in the foundation information database 112, and the index information that is ultimately stored in the index information database 122. The detailed operation of the capture and digitizer component 304 and the index generation component 308 shall now be described with reference to a data flow diagram shown in FIG. 3.

The capture and digitizer component 304 receives source information 302. The source information 302 represents information that has been produced over time by one or more parties (each party being a person or organization), and that would be of value to some end users (i.e., those persons working at the user devices 106). This information may be stored in any number of storage mediums, such as paper, film, video, compact disk, magnetic tape, computer storage disks, etc.

Figure 4:
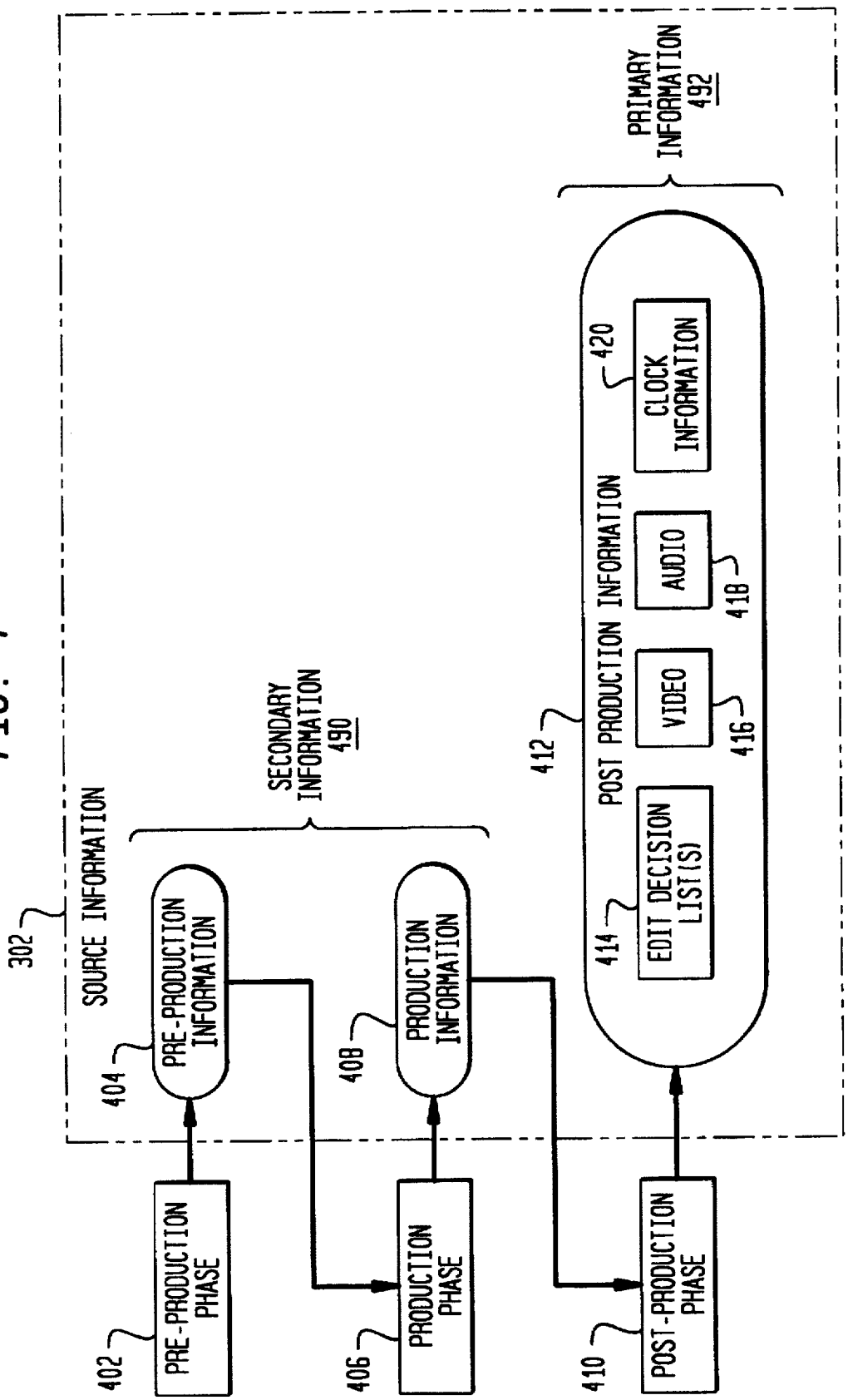

An example of the contents of the source information 302 in the movie embodiment of the present invention is illustrated in FIG. 4. FIG. 4 also illustrates the process by which the source information 302 is generated in the movie embodiment.

As will be appreciated by persons skilled in the relevant art(s), a motion picture is generally produced in three phases: a pre-production phase 402, a production phase 406, and a post-production phase 410. Source information 302 is generated during each of these phases. Specifically, pre-production information 404 is generated during the pre-production phase 402, production information 408 is generated during the production phase 406, and post-production information 412 is generated during the post-production phase 410.

The pre-production information 404 includes, for example, diagrams of models, storyboards, contracts with actors and other persons and organizations associated with the movie, information on locations, versions of scripts, etc. The production information 408 includes, for example, takes, continuity sheets, department work orders, etc.

The post-production information 412 includes, for example, one or more edit decision lists 414. An edit decision list 414 specifies the scenes, takes, and/or clips that are in the theatrical version of the movie. There may be multiple versions of a movie (for example, the director's version, the unrated version, a signed version, etc.). Generally, an edit decision list 414 exists for each version.

The post-production information 412 also includes the video 416 and audio 418 associated with each version of the movie, and clock information 420 that is embedded in the video 416 and audio 418. Each frame in a movie has a time code. These time codes represent the clock information 420. The clock information 420 and time codes are discussed in greater detail below.

The edit decision list 414, video information 416, audio information 418, and clock information 420 represent primary information 492, whereas the pre-production information 404 and the production information 408 represent secondary information 490 (also called movie related information). Primary information 492 is what is normally presented and available to the public. Its creation is the purpose for performing a process such as that shown in FIG. 4. Secondary information 490 is generated for the purpose of generating the primary information 492, and/or is generated during the creation of the primary information 492, and/or is related to the primary information 492. In other words, the primary information 492 is generated from the secondary information 490. The secondary information 490 is not generally presented to or available to the public. However, often the public would be very interested in this secondary information 490, and would be willing to pay a fee to have access to it. The present invention is directed to providing the public with access to this secondary information 492 in an intelligent, user-friendly manner. Although the concepts of primary information 492 and secondary information 490 have been explained with reference to the movie embodiment, it should be understood that primary information 492 and secondary information 490 are generated in other contexts, and the present invention is equally applicable to these other contexts.

The pre-production information 404, production information 408, and post-production information 412 of the source information 302 can be stored in any number of storage mediums. For example, diagrams of models, storyboards, contracts with actors and other persons, location information, and department work orders are typically stored on paper. Scripts are also stored on paper, but may additionally be stored in electronic form on computer storage disks (i.e., floppy disks). An edit decision list 414 is stored on paper, and may additionally be stored in the electronic form used by automated offline editing tools. Takes are stored on film. Video 416 is stored on film and/or VCR tapes. Audio 418 is stored on tape, compact disks, computer storage disks, etc.

Referring again to FIG. 3, the capture and digitizer component 304 converts the source information 302 to foundation information 306. The foundation information 306 has the same information content as the source information 302, but is in digital form. Thus, the foundation information 306 is a digital, electronic representation of the source information 302.

Specifically, the capture and digitizer component 304 captures or otherwise extracts the source information 302 from the mediums on which they are stored, digitizes the captured/extracted source information 302, and stores such digitized information as the foundation information 306. Preferably, the operation of the capture and digitizer component 304 is automated to the greatest extent possible, but may require some human intervention and control depending on available technology.

The capture and digitizer component 304 includes, for example, scanners, optical character recognition (OCR)

devices and processes, data compressors and decompressors, data extract and capture devices and processes, data converters, etc. The structure and operation of these devices and processes are well known to persons skilled in the relevant art(s) and, thus, shall not be described further.

In some cases, at least some portions of the source information 302 are already in digital, electronic form. Such portions of the source information 302 are directly stored as foundation information 306, as indicated by data flow line 312.

Eventually, it is possible that most or even all of the source information 302 will be available in digital, electronic form (once this occurs, the role of the capture and digitizer component 304 will be reduced or even eliminated). This is true for at least two reasons. First, the advance in computer technology is making it more and more attractive for parties to perform their work using a computer. As a result, that work is stored in digital, electronic form. Second, information generators who intend to utilize the present invention will have an incentive to store their work in digital, electronic form (the incentive being the ability to eliminate the capture and digitizer component 304).

The index generator component 308 analyzes the foundation information 306 and produces index information 310. The operation of the index generator component 308 is automated to the greatest extent possible, but may include user intervention and control (such as keying in index information). The index information 310 represents indices of the foundation information 306. Accordingly, the organization of the foundation information 306 is established by the index information 310. For example, suppose the foundation information 306 includes works by a group of authors, and articles written about those works and authors. In this example, the index information 310 may have a first table listing by author works available in the foundation information 306, a second table listing articles available in the foundation information 306 about each author, and a third table listing articles available in the foundation information 306 about each work.

Figure 5:
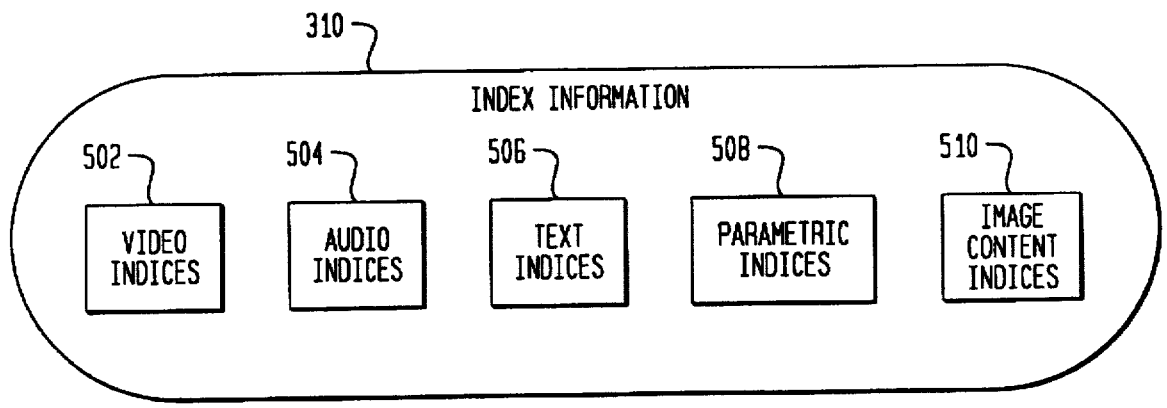
FIGS. 5 and 6 illustrate example index information contents.
Figure 6:
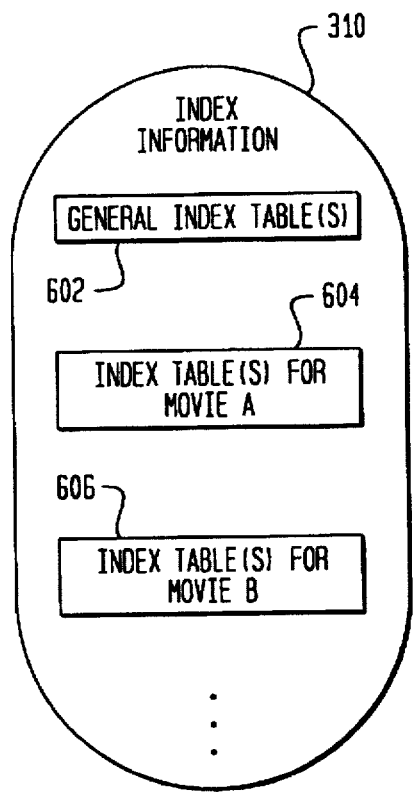

With regard to the movie embodiment, and referring to FIG. 5, the index information 310 may include, for example, video indices 502, audio indices 504, text indices 506, parametric indices 508, and image content indices 510. Referring now to FIG. 6, the index information 310 in the movie embodiment includes general index table(s) 602 that pertain to all movies (such as actor biographies), and index table(s) 604, 606 specific to each movie. These tables 602, 604, 606 in FIG. 6 may each include indices as shown in FIG. 5. The index information 310 specific to the movie embodiment is discussed in greater detail below.

Video Frame Pedigree

Figure 7:
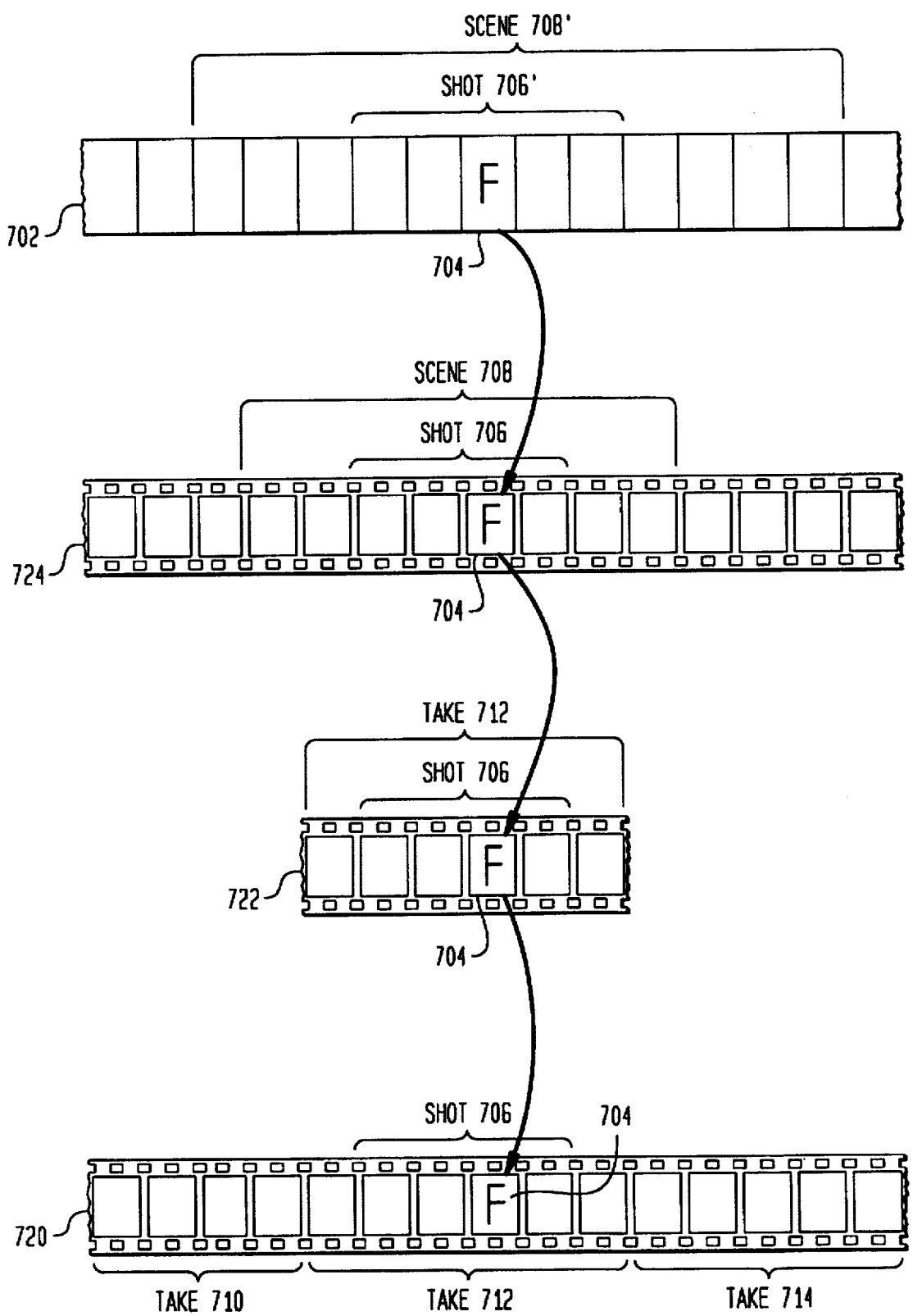
FIG. 7 illustrates the pedigree of a frame.

Referring now to the movie embodiment of the present invention, FIG. 7 generally illustrates the making of a movie.

As is well known, during the production phase 406 a series of takes 710, 712, 714 are shot on film 720 (typically 35 mm film in full-frame super-35 format). Film 720 represents "negatives" and, thus, shall be called "negative film 720" for reference purposes. A take is the sequence of frames (such as frame 704) from the clap of a clapboard (when the director says "action") to when the director says "cut" or "cut and print." There are many types of takes, such as a master take, a close up (CU), an extreme close up (ECU), etc. Each take has one or more shots, such as shot 706 in take 712. A shot represents those frames in the take which are of value, and which may be used in the movie.

Each frame in the negative film 720 has an unique time code which can be tied to the start of the respective take (i.e., from the clap of the clapboard). Thus, the frames in the negative film 720 can be identified by reference to time codes.

The negative film 720 is developed and portions are printed (they are now positive) and are called "dailys." If the director ends a take by saying "cut and print," then that take is printed. Otherwise, it is not printed. FIG. 7 shows a portion of a daily 722. This daily 722 includes the shot 706 containing the frame 704. Each frame in the dailys 722 includes a unique time code. These time codes in the dailys 722 are the same as the time codes in the negative film 720 as they were copied in the printing process.

During the post-production phase 410, a theatrical presentation 724 of the movie is produced. The theatrical presentation 724 includes a sequence of scenes, such as scene 708. Each scene includes one or more shots, such as shot 706 in scene 708. The theatrical presentation 724 is typically generated by splicing together frames from the dailys, such as frame 704 from daily 722. This produces a work print of the whole movie. Using the workprint as a master, the negative film is cut and spliced to match. The cut negative is then printed to produce a timed (color corrected) positive. All the prints so far have been contact prints so the original time codes are preserved. The theatrical negative (not shown) is produced optically (to change aspect ratio, make room for sound tracks, etc.) and new time codes are assigned for the whole movie. Theatrical presentation 724 prints are made from that negative. Each frame in the theatrical presentation 724 includes an unique time code copied from the theatrical negative. These time codes are measured from the beginning of the theatrical presentation 724. Thus, the time codes in the theatrical presentation 724 differ from the time codes in the dailys 722 and the negative film 720. However, the process for converting from the time codes in the theatrical presentation 724 to the time codes in the dailys 722 and negative film 720, and vice versa, is well known.

Typically, versions of the movie other than the theatrical presentation 724 are produced. One such version is the VCR video version 702. Video runs at a different speed than film. Typically, video runs at 30 fps (frames per second) or 25 fps, while film runs at 24 fps. To compensate for this difference, additional frames are added to the shots in the VCR video version 702. For example, a shot 706' in the VCR video version 702 includes five frames, whereas the corresponding shot 706 in the theatrical presentation 724 includes four frames. Each frame in the VCR video version 702 includes an unique time code. These time codes are measured from the beginning of the VCR video version 702. Since the number of frames per shot differ in the VCR video version 702 and the theatrical presentation 724, the time codes between the VCR video version 702 and the theatrical presentation 724 also differ. However, the process for converting from the time codes in the VCR video version 702 to time codes in the theatrical presentation 724, and to the time codes in the dailys 722 and negative film 720, and vice versa, is well known.

Accordingly, it is possible to trace the lineage of any frame 704 through the negative film 720, the dailys 722, the theatrical presentation 724, the VCR video version 702, and any other version of the movie not shown in FIG. 7, by using the time code of the frame, and also by using the well known time code conversion processes mentioned above.

Source Table

FIG. 8 depicts a source table 802 according to a preferred embodiment of the present invention. A source table 802 exists for each version of a movie (i.e., the theatrical presentation, the VHS video version, the unrated version, the director's version, etc.), although the source tables 802 for different versions may be very similar to each other. In some cases, different versions may have the same source table 802.

The source table 802 is similar to an edit decision list, but the source table 802 contains information not found in a conventional edit decision list. Also, the present invention uses the source table 802 in ways that differ from the ways that an edit decision list is used. Further, according to the present invention, the source table 802 is organized and stored in electronic form. In fact, the source table 802 is part of the index information that is stored in the index information database 122.

The source table 802 specifies the scenes, takes, and/or clips that are in a version of a movie. The source table 802 contains sufficient information so that the lineage of each frame in the movie can be identified and located (an example, of a frame's lineage or pedigree is shown in FIG. 7). The source.table 802 represents a linkage mechanism so that foundation information 108 related to each frame can be identified, located, and retrieved from the foundation information database 112.

The source table 802 includes a row for each scene, clip, and take in the movie version. A clip is a sequence of frames taken without regard to scene, shot or take boundaries. However, it is taken from a single source with a uniform time base (such as theatrical presentation 724) so that the start time code and end time codes have unique meanings. A type code column 804 in the source table 802 identifies whether the row is a scene, clip, or take, and identifies the type of take (master, close up, extreme close up, etc.).

A first frame time code column 806 stores the time code of the first frame of the item corresponding to the row. Thus, if the row corresponds to a scene, then the first frame time code column 806 stores the time code of the first frame of the scene. The time code stored in the first frame time code column 806 is measured from the beginning of the movie version to which the source table 802 is associated. The present invention preferably uses SMPTE (Society of Motion Picture Television Experts) time codes, but other time codes could alternatively be used.

A last frame time code column 808 stores the time code of the last frame of the item corresponding to the row. Thus, if the row corresponds to a scene, then the last frame time code column 808 stores the time code of the last frame of the scene. The time code stored in the last frame time code column 808 is measured from the beginning of the movie version to which the source table 802 is associated.

A frame count column 810 stores a number that is equal to the number of frames in the item corresponding to the row. Thus, if the row corresponds to a scene, and the scene has 79 frames, then the frame count column 810 stores "79."

A source title column 816 stores information identifying the source of the item corresponding to the row. Referring to FIG. 7, suppose that the row corresponds to the take 712. The source of this take 712 is the daily 722 (actually, the ultimate source of take 712 is negative film 720, but preferably the present invention utilizes positives where possible, rather than negatives and the time codes match). Thus, information identifying the daily 722 is stored in the source title column 816. As discussed above in conjunction with FIG. 3, the images on the daily 722 were captured, digitized, and stored as foundation information 306 in the foundation information database 112. Preferably, what is stored in the source title column 816 is information sufficient to locate these digitized images of the daily 722 in the foundation information database 112 (such as a file name or address).

Note that the frames in a scene may originate from a number of sources. Thus, the source title column 816 is blank (or not applicable, N/A) for rows corresponding to scenes. Similarly, the source first frame time code column 812 and the source frame count column 814 (described below) are also blank.

A source first frame time code column 812 stores the time code of the first frame of the item identified by the source title column 816. Assume, again, that the row corresponds to the take 712 in FIG. 7. The source first frame time code column 812 stores the time code of the first frame of the take 712. The time code stored in the source first frame time code column 816 is measured from the beginning of the item identified by the source title column 816, i.e., from the beginning of the take 712.

A source frame count column 814 stores a number that is equal to the number of frames in the item identified by the source title column 816.

A "for which scene" column 818 contains information that identifies the scene in which the item corresponding to the row is used. For example, if the row corresponds to a take, then the "for which scene" column 818 contains information that identifies the scene in which the take is used. This column is blank for rows corresponding to clips.

User-Driven Operation of the Present Invention

Figure 3:
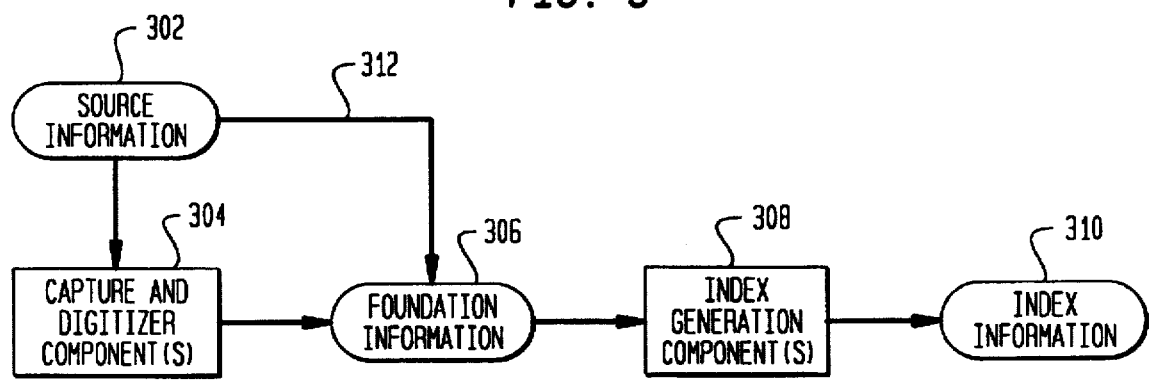
FIGS. 3 and 4 are data flow diagrams depicting the manner in which foundation and index information is generated according to a preferred embodiment of the present invention.

The user-driven operation of the present invention shall now be described in conjunction with a flowchart depicted in FIG. 9A. This "user-driven" operation differs from the operation of the invention as shown in FIG. 3. Specifically, FIG. 3 illustrates the manner in which the present invention generates foundation information 306 and index information 310. The user-driven operation depicted in FIG. 9A refers to the manner in which the present invention access, retrieves, and presents foundation information 306 from the foundation information database 112 to users in response to information requests and/or queries from users.

For illustrative purposes, the user-driven operation of the present invention shall be described with reference to the movie embodiment. It should be understood, however, that the present invention is not limited to the movie embodiment. The following description is applicable when the present invention is used in other applications.

The flowchart in FIG. 9A begins with step 950, where control immediately passes to step 952.

In step 952, in response to an appropriate request from an user via an user device 106, the presentation and control component 104 transfers to the user device 106 a list of items which the user may view and/or interact with. Such items include, for example, various versions of movies, audio tracks related to movies, video games related to movies, text from books or magazines related to movies, etc. Such items also include personalized movie presentations and personalized movie collections, which are discussed in U.S. patent application entitled "System and Method for Enabling the Creation of Personalized Movie Presentations and Personalized Movie Collections," Attorney Docket No. ST9-94-045 (1252.1910000) Ser. No. 08/407,305 now abandoned, referenced above.

The presentation and control component 104 preferably performs step 952 by accessing the index information database 122 (via the index interface component 118) and/or the foundation information database 112 (via the foundation information interface component 108) for a listing of possible viewing choices. This list of viewing choices is transferred from the presentation and control component 104 to the user device 106 via the communication medium 124. The user device 106 displays this list of viewing choices in a well known manner.

In step 954, the presentation and control component 104 receives from the user (via the communication medium 124 and the user device 106) information identifying a particular item which the user wishes to view.

In step 956, the presentation and control component 104 accesses and retrieves the item identified by the user. In one embodiment, an Item Locator table (which may be implemented as a collection of tables) is stored in the index information database 122. The Item Locator table has a row for each of the possible viewing choices. Each row stores at least (1) the name of the item (or other information to unambiguously identify the item), and (2) address information identifying the location in the foundation information database 112 where the item is stored.

The presentation and control component 104 performs step 956 by accessing the Item Locator table (via the index interface component 118), locating the row corresponding to the item identified by the user, extracting the address information from this row, and using this address information to access and retrieve the item from the foundation information database 112 (via the foundation information interface component 108). The item is transferred to the presentation and control component 104 via the communication medium 124. For example, if the item is a movie, then the digitized frames of the movie are transferred from the foundation information database 112 to the presentation and control component 104.

In step 958, the presentation and control component 104 begins to present the item to the user by transferring consecutive parts of the item to the user device 106. It is noted that the item is transferred to a location specified by the user (such as the user's home). Also, the item is preferably transferred to this location immediately after the user has selected the item. Thus, the present invention implements true video on demand.

For illustrative purposes, the following discussion assumes that the item is a movie. Thus, during step 958, the presentation and control component 104 sends the first digitized frame to the user device 106, where the frame is displayed.

In step 960, the presentation and control component 104 determines whether it has received a query pertaining to the movie from the user (via the user device 106 and the communication medium 124). The manner in which the user sends a query is described below. If a query has been received, then the presentation and control component 104 processes the query in step 962, and then proceeds to step 964. The manner in which queries are processed are described below. Step 964 is also processed if no query was received.

In step 964, the presentation and control component 104 determines if there are any additional frames in the movie that have not yet been sent to the user. If additional frames exist, then control returns to step 958 where the next frame is sent to the user device 106. Otherwise, operation of the flowchart of FIG. 9A is complete, as indicated by step 966.

The above-described operation of the present invention can be modified in any number of ways to achieve better performance. For example, according to an alternate embodiment, the movie is sent directly to the user device 106 from the foundation information database 112, rather than being sent first to the presentation and control component 104. Also, in this alternate embodiment, the entire movie is sent to the user device 106 all at one time, rather than being sent frame by frame.

In another alternate embodiment, personalized movie presentations and personalized movie collections are retrieved from the foundation information database 112 and presented to the user according to index information contained in personalized edit decision lists. Personalized movie presentations and personalized movie collections are discussed further in U.S. patent application entitled "System and Method for Enabling the Creation of Personalized Movie Presentations and Personalized Movie Collections," Attorney Docket No. ST9-94-045 (1252.1910000) Ser. No. 08/407,305 now abandoned, referenced above.

Sending and Interpreting User Queries

The user can send a query to the presentation and control component 104 at any time while viewing and/or interacting with a movie (or some other item). Preferably, the user signals a query by pressing the "Pause" button provided by the user device 106 (this "Pause" button may be situated on the remote control unit, on the set top box, or on the computer keyboard, for example). By pressing the "Pause" button, the user indicates that he has a question regarding the movie, scene, cut, and/or frame that is currently being displayed. The question may be, for example, "Who is this person?," "What other movies has this director done?," "Why is the street in this street wet when it appears to be a clear day?," or "What other movies have script lines similar to what was just said?" The questions which users are allowed to ask are implementation dependent. Thus, the particular questions discussed herein are presented for illustrative purposes only, and are not limiting.

Preferably, the user identifies his specific question by traversing an user menu hierarchy. User menus are well known. Thus, the specifics of the user menu hierarchy used to identify user questions shall not be discussed in detail.

It is noted, however, that the user menu may be driven and controlled by the presentation and control component 104 by exchanging control and data signals between the presentation and control component 104 and the user device 106. Alternatively, software control logic and/or hardware control logic can be incorporated into the user device 106 such that the user device 106 drives and controls the user menu.

Note that the question "Who is this person?" is somewhat ambiguous, in that it could mean "Who is the principle actor?," or "Who is the stunt double actor?," or "Who is the character?" In one embodiment of the invention, this ambiguity is solved by having a very detailed menu structure, so that the precise question is identified by the user. However, users may find this approach somewhat tedious.

Accordingly, to an alternate embodiment, the present invention makes assumptions as to what the users' precise questions are. For example, if the user asks "Who is this person?," the present invention may assume that the user is really asking "Who is the character in this scene?" The assumptions made by the present invention in this alternate embodiment are implementation dependent and are based on many factors, such as the context in which the question was asked, market information, surveys, empirical use, etc. For illustrative purposes, this alternate embodiment of the invention (where assumptions are made as to the user's precise question) is described below. The assumptions that are employed in the following description are used only by way of example, and may differ depending on the particular implementation.

Processing User Queries

FIG. 9B presents a flowchart depicting the manner in which the present invention processes an user query (i.e., the manner in which the present invention performs step 962 in FIG. 9A). The flowchart in FIG. 9B begins with step 902, where control immediately passes to step 904.

In step 904, the user device 106 determines the time code corresponding to the current frame (this time code is called the "current frame time code" for reference purposes). The user device 106 then transfers the current frame time code to the presentation and control component 104 via the communication medium 124. (The user device 106 may send the current frame time code such that the presentation and control component 104 receives it at the same time as receiving the user query, i.e., at step 960 in FIG. 9A.)

The "current frame" represents the frame that was being presented on the user device when the user issued the query (i.e., pressed the "Pause" button). As noted above, clock information 420 (i.e., time code information) is embedded in the video data 416 of the movie (see FIG. 4). Accordingly, in step 904, the user device 106 extracts the current frame time code corresponding to the current frame from the video data 416 of the movie being presented to the user.

The current frame time code is measured from the start of the movie (rather than being measured from a daily 722 or negative film 720, for example). Thus, time code conversions are performed in subsequent steps.

In step 906, the presentation and control component 104 accesses the index information database 122 (via the index interface component 118) and extracts from the source table 802 associated with the movie being presented (called the current movie for reference purposes) all rows where the current frame time code is greater than or equal to the first frame time code, and the current frame time code is less than or equal to the last frame time code.

In step 908, the presentation and control component 104 identifies the query type or category. This query type is indicated by information contained in the user query received in step 960 of FIG. 9A (it is assumed that the user selected a query type by traversing an user menu hierarchy, as discussed above). Each implementation of the present invention supports a set of query types. For illustrative purposes, a selected set of query types is discussed below. Other query types will be apparent to persons skilled in the relevant art(s).

In step 910, the presentation and control component 104 processes the user query according to the type of the query as identified in step 908. The manner in which the presentation and control component 104 processes a selected set of query types is discussed below. The processing of other query types will be apparent to persons skilled in the relevant art(s).

The flowchart of FIG. 9B is complete after step 910 is performed, as indicated by step 912.

Query Type: Who Is This?

This section discusses the "who is this?" query type. According to an embodiment of the present invention, the index information database 122 stores at least three index tables to support the processing of this query type: an Actor In Take table 1002, a Character In Scene Table 1012, and an Actor Play Character table 1018. These tables 1002, 1012, 1018 represent movie specific tables, and are shown in FIGS. 10A–10C.

The Actor In Take table 1002 includes at least one row for each actor appearing in each take. An actor column 1004 stores the name of the actor, a take title column 1006 stores the name of the take, a start time code column 1008 stores the time code of the first frame of the take in the current movie, and the end time code column 1010 stores the time code of the last frame of the take in the current movie. The time codes in the start time code column 1008 and the end time code column 1010 are measured from the start of the current movie. Information for the Actor In Take table 1002 is derived by the index generator component 308 by reference to production schedule information (that is part of the production information 408).

The Character In Scene table 1012 includes a row for each character who appears in each scene. A scene column 1014 stores the name of the scene, and a character column 1016 stores the name of a character who appears in the scene. Information for the Character In Scene table 1012 is derived by the index generator component 308 by reference to the script.

The Actor Plays Character table 1018 includes, for each character in the current movie, a row for each actor who plays the character. A character column 1020 stores the name of the character, an actor column 1022 stores the name of an actor who plays the character, and a code column 1024 identifies the manner in which the actor played the character (i.e., as the principle actor, as the stunt double, as the body double, etc.). Information for the Actor Plays Character table 1018 is derived by the index generator component 308 by reference to the credits of the movie and the production schedule.

FIG. 11 depicts a flowchart representing the manner in which the present invention processes a "who is it?" query according to one embodiment. This flowchart begins with step 1102, where control immediately passes to step 1106.

In step 1106, the presentation and control component 104 retrieves from the Actor In Take table 1002 rows that relate to the current frame. Step 1106 is performed by reference to the rows that were retrieved from the source table 802 in step 906. Step 1106 is performed by retrieving from the Actor In Take table 1002 all rows having a start time code (from column 1008) equal to the start time code (from column 806 in the Source table 802) in the take row retrieved in step 906, and also having an end time code (from column 1010) equal to the end time code (from column 808 in the source table 802) in the take row retrieved in step 906. These rows from the Actor In Take table 1002 identify the actors who appear in the current frame.

Step 1104 tests to see that at least one actor 1004 was included in that take. (It might have been a long scenery shot for example.) If no actors are found in the take, then the scope is widened to include all the characters in the entire scene and processing continues at step 1120. Otherwise, processing continues with step 1108.

In step 1108, the presentation and control component 104 transfers to the user device 106 via the communication medium 124 the names of the actors stored in the actor column 1004 of these rows retrieved from the Actor In Take table 1002. The user device 106 presents these names to the user in a well known manner.

In step 1110, the presentation and control component 104 retrieves all rows from the Actor Plays Character table 1018 associated with all actors identified in step 1106 (i.e., actors corresponding to rows retrieved from the Actor In Take Table 1002). Step 1110 is performed by reference to the actor column 1022 in the Actor Plays Character table 1018.

In step 1112, the presentation and control component 104 transfers to the user device 106 via the communication medium 124 the names of the characters stored in the character column 1020 of these rows retrieved from the Actor Plays Character table 1018. The user device 106 presents these names to the user in a well known manner.

In step 1114, the presentation and control component 104 retrieves from the Actor Plays Character table 1018 all rows with code 1024 value of "principal" related to the characters identified in step 1110 (i.e., the characters corresponding to the rows retrieved from the Actor Plays Character table 1018). Step 1114 is performed by retrieving from the Actor Plays Character table 1018 all rows corresponding to these identified characters.

In step 1116, the presentation and control component 104 transfers to the user device 106 via the communication medium 124 the names of the actors (column 1022) and their roles (column 1024) from these rows retrieved from the Actor Plays Character table 1018. The user device 106 presents this information to the user in a well known manner.

If, in step 1104, it is determined that no actor may be in the current frame, then step 1120 is performed. In step 1120, the presentation and control component 104 retrieves all rows from the Character In Scene table 1012 associated with characters appearing in the current scene. The "current scene" is the scene in which the current frame is contained, and is identified by reference to information stored in the "for which scene" column 818 in the take row previously retrieved from the source table 802 (in step 906). Step 1120 is performed by retrieving from the Character In Scene table 1012 all rows corresponding to the current scene (by reference to the scene column 1014 in the Character In Scene table 1012).

In step 1122, the presentation and control component 104 transfers to the user device 106 via the communication medium 124 the names of the characters stored in the character column 1016 of these rows retrieved from the Character In Scene table 1012. The user device 106 presents these names to the user in a well known manner. After step 1122 is performed, then control moves to step 1114, described above (although, in this case, step 1114 is performed based on the results of step 1120).

The operation of the flowchart in FIG. 11 is complete after step 1116 is performed, as indicated by step 1118.

Query Type: What Other Films Has This Director Worked On?

This section discusses the "what other films has this director worked on?" query type. According to an embodiment of the present invention, the index information database 122 stores at least two index tables to support the processing of this query type: an One Movie Credit table 1202 (which is movie specific) and an All Movies Credit table 1208 (which applies to all movies). These tables 1202, 1208 are shown in FIGS. 12A and 12B.

The One Movie Credit table 1202 includes at least one row for each person involved in the creation of the movie (for example, a row for each person listed in the credits). Each row includes a person column 1204 storing the name of the person, and a job column 1206 indicating the person's position. If a person had many jobs, then there is one row in the One Movie Credit table 1202 for each job. Information for the One Movie Credit table 1202 is derived by the index generator component 308 by reference to the credits of the movie, and also by reference to contracts (pre-production information 404).

The All Movies Credit table 1208 includes one row for each job that each person had in each movie represented in the foundation information database 112. A movie title column 1212 stores a movie's name, a person column 1214 stores a person's name, a job column 1216 stores a job that the person had in the movie, and a table identifier row 1210 stores information that identifies where other index tables specific to the movie are stored in the index information database 122. Information for the All Movies Credit table 1208 is derived by the index generator component 308 by reference to the credits of the movie, and also by reference to contracts (pre-production information 404).

The present invention processes a "what other films has this director worked on?" query type as follows. First, the presentation and control component 104 accesses the One Movie Credit table 1202 for the current movie and retrieves the row where the job column 1206 is equal to "Director." Second, the presentation and control component 104 extracts the name of the director from the person column 1204 of this row. Third, the presentation and control component 104 accesses the All Movies Credit table 1208 and retrieves all rows where the person column 1214 is equal to the director's name. Fourth, the presentation and control component 104 extracts the movie title (from the movie title column 1212) and the job (from the job column 1216) from these rows and sends them to the user device 106 via the communication medium 124. The user device 106 displays this information in a well known manner.

Query Type: When Did This Happen?

This section discusses the "when did this happen?" query type. According to an embodiment of the present invention, the index information database 122 stores at least two index tables to support the processing of this query type: a Time In Story table 1302 and a Take Details table 1312, both of which are movie specific. These tables 1302, 1312 are shown in FIGS. 13A and 13B.

The Time In Story Table 1302 has a row for each scene in the current movie. A scene column 1304 stores the name of the scene, a time since story start column 1306 that stores a value representing the time (in terms of the story) that has elapsed since the current movie started, a time since last scene column 1308 that stores a value representing the time (in terms of the story) since the last scene ended, and an absolute date/time column 1310 that stores a value that represents the date and time (in terms of the story) of the events depicted in the current scene. Information for the Time In Story table 1302 is derived by the index generator component 308 by reference to time references in the script (for example, time indicators such as "that night," "later that day," "next morning," etc.).

The take details table 1312 has a row for each take. A take title column 1314 stores the title of the take, a take first frame time code column 1316 stores the time code of the take measured from the beginning of the current movie, a location name column 1318 stores the name of the location where the take was shot, a date shot (created) column 1320 and a time shot (created) column 1322 store a date and time when the take was shot, and a method column 1324 stores information identifying the manner in which the take was shot (i.e., steady-cam, digital morph, etc.). Information for the Take Details Table 1312 is derived by the index generator component 308 by reference to the production schedule.

The present invention processes a "when did this happen?" query type as follows. First, the presentation and control component 104 identifies the current scene by reference to the "for which scene" column 818 in the take row previously retrieved from the source table 802. Second, the presentation and control component 104 retrieves from the Time In Story Table 1302 the row where the scene column 1304 is equal to the name of the current scene. Third, the presentation and control component 104 extracts the time and date information from columns 1306, 1308, and 1310 of this row, and forwards this information to the user device 106 via the communication medium 124. The user device 106 displays this information in a well known manner.

The present invention alternatively processes a "when did this happen?" query type as follows. First, the presentation and control component 104 retrieves from the Take Details table 1312 the row where the value in the take first frame time code column 1316 is equal to the value in the first frame time code 806 of the take row previously retrieved from the source table 802. Second, the presentation and control component 104 extracts the date and time information from columns 1320 and 1322 of this row, and forwards this information to the user device 106 via the communication medium 124. The user device 106 displays this information in a well known manner.

Other queries can be answered by reference to the Take Details Table 1312. For example, a "Where was this take shot?" query can be answered by reference to the location name column 1318, and a "How was this take shot?" query can be answered by reference to the method column 1324.

Query Type: Why Queries

A "why" query is supported only if a corresponding answer is available. An example why question is: "Why is the street in this scene wet when it appears to be a clear day?" A typical answer is: "The director of photography uses water to create more interesting images on film by capturing the reflections of other parts of the scene in the street. The director calls for a wet-down just before the shot and a water truck drives through the scene and makes it wet."

Figures 14A, 14B, 15:
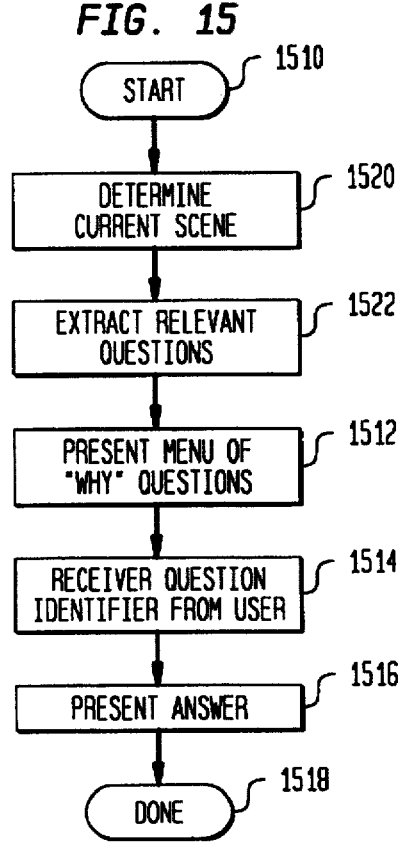

The tables and methods for answering these "why" questions are shown in FIG. 14A, FIG. 14B and FIG. 15. Preferably, the present invention includes a Question/Answer table 1404 and Question Applies to Scene table 1424 to support "why" questions. These tables 1404, 1424 are movie specific, and are stored in the index information database 122. Information for the Question/Answer table 1404 and Question Applies to Scene table 1424 is derived by the index generator component 308 by reference to many sources, such as interviews with persons involved in the making of the movie, diaries kept during the making of the movie, books describing the making of the movie, etc. Preferably, a human operator uses this information to compose "why" questions and their answers, and to insert these questions and answers in the Question/Answer table 1404. Similarly, a human operator uses this information to determine appropriateness of each question to particular scenes or sequences of scenes and inserts this information into the Question Applies to Scene table 1424.

The Question/Answer table 1404 includes a row for each why question that is supported. A Question Number column 1406 uniquely identifies the question, a question column 1408 stores the why question, and an answer column 1410 stores an answer to the question.

The Question Applies to Scene table 1424 includes a row for each segment of a movie to which a question applies. A Question Number column 1426 identifies the question, a First Scene column 1428 identifies the first scene in a sequence of scenes for which this question is appropriate, and a Last Scene column 1430 identifies the last scene in a sequence of scenes for which this scene is appropriate. Since questions can apply to several scenes in a movie, many rows may have the same Question Number 1426. Many questions will apply to any given scene so First Scene 1428 and Last Scene 1430 values may also be repeated.

The present invention processes a why question as is shown in FIG. 15. The procedure gets control at 1510 and proceeds immediately to the first processing step 1520. First the presentation and control component 104 accesses the row of source table 802 where the type code 804 is "scene" and the current time code of the movie is between the First Frame Time Code 806 and the Last Frame Time Code 808 to retrieve the correct for which scene 818 value. Second, step 1522, the Question Applies to Scene table is accessed to retrieve a list of question numbers 1426 where the previously retrieved for which scene 818 value is between the First Scene 1428 and Last Scene 1430. There is a possibility of duplicate question number 1426 values in the list and these should be removed. Third, step 1512, the questions 1408 from the Question/Answer table 1404 along with the questions numbers 1406 are forwarded to the user device 106 through the communication medium 124 and are subsequently displayed in a well known manner. Upon receipt of a response from the user device 106, the question 1408 and answer 1410 corresponding to the question number 1406 selected by the user are retrieved 1514. Finally, step 1516, the question 1408 and answer 1410 are forwarded to the user device 106 via the communication medium 124. The user device 106 displays this information in a well known manner. Processing then proceeds directly through termination 1518.

Show Option

According to an embodiment of the invention, the user can request that the script be displayed as the movie is presented. The present invention processes this user request as follows. First, the time code for the current frame is determined. Second, the row corresponding to the current scene is retrieved from the source table 802. This is done by identifying a scene row in the source table 802 where the current frame time code is greater than or equal to the value of the first frame time code column 806, and less than or equal to the value of the last frame time code column 808. Based on the information contained in this scene row, it is possible to synchronize the display of the movie with the display of the script (the script is retrieved from the foundation information database 112).

The operation of the show option shall now be discussed in greater detail. The identified row (described above) is the first of a sequential set of scene rows which describe the rest of the movie. Each has values for frame count 810 and for which scene 818. The Script text is accessed using the for which scene 818 values obtained from the source table 802 as index keys. The frame count 810 from each row tells exactly how long that scene will be on the screen. The scrolling rate of the script text is adjusted so that the script rolls by in the same amount of time that the scene takes in the movie. Each new segment of the script is accessed to have it ready when it has to start appearing on the screen. Since the scrolling window has many lines of the script on it, the slug line for the following scene will appear before the video for the current scene has completed. Well known techniques for anticipatory buffering enable smooth scrolling and synchronization.

Merchant Gateway

According to an embodiment of the present invention, the query types discussed above include queries related to merchandising. Additionally, the present invention provides a gateway to the merchants themselves so that users can obtained detailed information relating to merchandise, and can purchase merchandise from the merchants.

Consider, for example, the movie embodiment. In this case, some merchandising queries include:

Who made the sofa in this scene, and how much is it?

Where is the wall paper from this scene available, and in which colors?

Who designed the shoes worn by this actor, and are they available in size 8?

What is the hotel in this scene, and is it available June 8–12?

Who performed this music, and what other titles has he/she done?

What other films are available in a similar style?

The present invention supports the above-described functionality by providing a number of merchandising related index tables that are stored in the index information database 122. Information for these tables is derived by the index generation component 308 from contractual information (part of pre-production information 404), for example. Examples of merchandise related index tables are shown in FIGS. 22A and 22B, although the structure and construction of other merchandise related tables will be apparent to persons skilled in the relevant art(s) based on the discussion contained herein.

FIG. 22A illustrates a merchandise table 2202 which is movie specific. The merchandise table 2202 includes a row for each scene. A scene column 2204 stores the name of the scene. Other columns identify the merchandise that appear in the scene. For example, a furniture column 2206 specifies that a sofa appears in scene XYZ, a costumes column 2208 specifies that a jacket and a suit appear in scene XYZ, a location column 2208 specifies that the Grand Canyon appears in scene XYZ, a music column 2212 specifies that a soundtrack by ABC appears in scene XYZ, and a food column 2214 specifies that a soft drink appears in scene XYZ (the merchandise table 2202 could include additional columns).

FIG. 22B depicts a costume merchandise table 2216 which is movie specific. An index table similar to the costume merchandise table 2216 exists for each merchandise type in the merchandise table 2202. The costume merchandise table 2216 has columns corresponding to categories of costumes that are used in the movie. For example, the costume merchandise table 2216 includes a shoes column 2218, a dress column 2220, a suit column 2222, a hat column 2224, a belt column 2226, and a jacket column 2228 (the costume merchandise table 2216 could include additional columns). Each column lists merchants who provided costumes for the clothing type corresponding to the column. For example, the suit column 2222 indicates that merchants A and B provided suits that were used in the movie.

Figure 21:
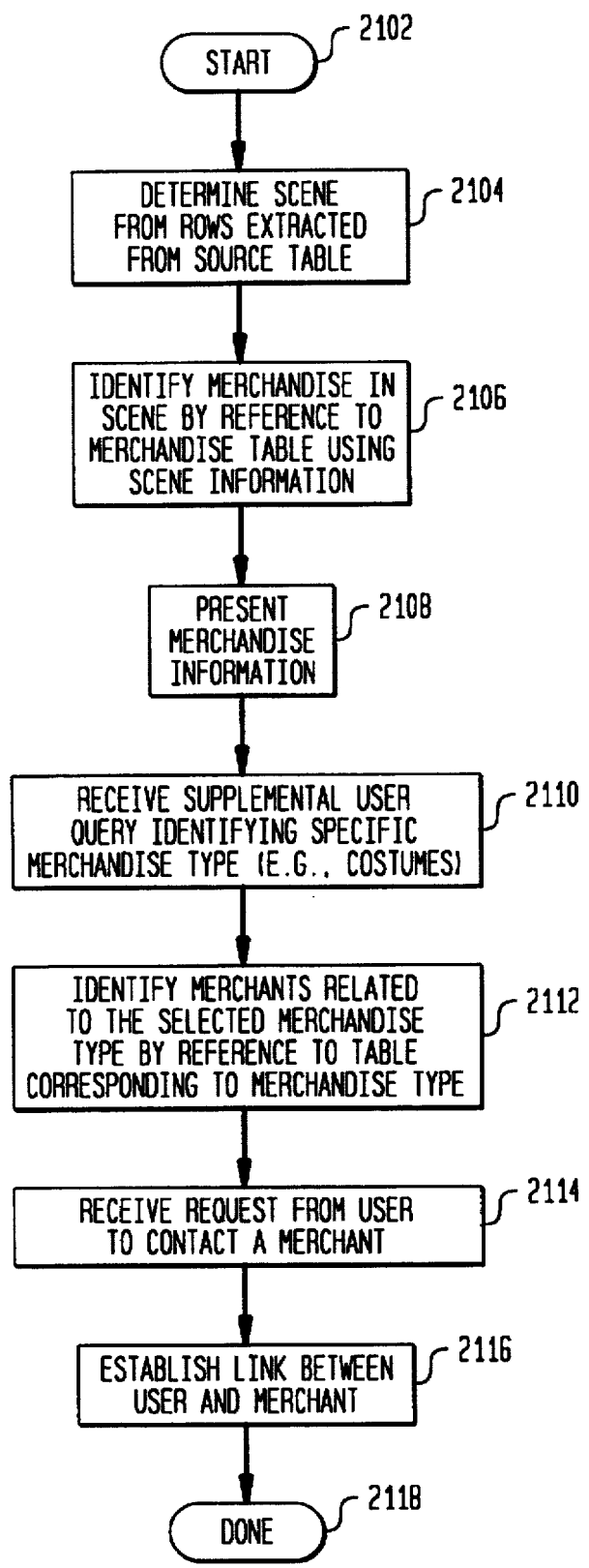

FIG. 21 illustrates a flowchart representing the manner in which the present invention processes a merchandise related query. This flowchart begins with step 2102, where control immediately passes to step 2104.

In step 2104, the presentation and control component 104 identifies the scene to which the current frame forms a part. As described above, the scene is determined by reference to the "for which scene" column 818 in the take row that was previously retrieved from the source table 802 in step 906 (FIG. 9B). For illustrative purposes, assume that the scene is the XYZ scene.

In step 2106, the presentation and control component 104 identifies which merchandise appears in the scene XYZ by reference to the merchandise table 2202. Step 2106 is performed by retrieving from the merchandise table 2202 all rows where the scene column 2204 is equal to "XYZ."

In step 2108, the presentation and control component 104 transfers the merchandise information contained in this row (retrieved in step 2106) to the user. Step 2108 is performed by transferring the information contained in the row to the user device 106 via the communication medium 124. This information is displayed by the user device 106 in a well known manner, such that the user is presented with a list of merchandise items that are present in the current scene XYZ.

In step 2110, the presentation and control component 104 receives a supplemental user query (or data) identifying the specific merchandise type that is of interest to the user. For illustrative purposes, assume that this supplemental user query indicates that the user is interested in costumes. The user issues this supplemental user query after reviewing the merchandise information presented in step 2108.

In step 2112, the presentation and control component 104 identifies merchants who provide the specific merchandise type (in this case, costumes) by reference to the index table that is related to the merchandise type (in this case, the costumes merchandise table 2216). The presentation and control component 104 sends the merchant information contained in the costumes merchandise table 2216 to the user device 106 via the communication medium 124. The user device 106 presents this information to the user, such that the user is provided with a list of which merchants provide each costume type. For example, the user is provided with a list that identifies that merchants A and C provide suits, and merchants A and B provide jackets.

Based on this information, the user may wish to contact one or more merchants to obtain additional information, and/or to order merchandise. If this is the case, the user sends a request to contact a particular merchant to the presentation and control component 104. The presentation and control component 104 receives this request in step 2114.

In step 2116, the presentation and control component 104 establishes a link between the user and the merchant. Once a connection is established, the user can interact directly with the merchant to obtain information on merchandise, and/or to order merchandise.

Preferably, a merchant transaction processor 114 (FIG. 1) exists for each merchant (or perhaps each merchant transaction processor 114 represents a group of merchants). The merchant transaction processors 114 are gateways to merchants. Information on merchandise are provided by the merchant transaction processors 114. Additionally, orders for merchandise can be placed with merchants via the merchant transaction processors 114.

In one embodiment, the presentation and control component 104 performs step 2116 by establishing a connection (or session) between the user device 106 and the merchant transaction processor 114 which represents the merchant who the user wants to contact. In another embodiment, a cross merchant gateway 116 operates as an interface to the merchant transaction processors 114. In this embodiment, the presentation and control component 104 performs step 2116 by establishing a connection (or session) between the user device 106 and the cross merchant gateway 116, which in turn establishes a connection with the merchant transaction processor 114 which represents the merchant who the user wants to contact. Procedures for establishing such connections between the user devices and the cross merchant gateway 116 or the merchant transaction processors 114 are well known.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

While the invention has been particularly shown and described with reference to (a) preferred embodiment(s) thereof, it will be understood by those skilled in the art that (various changes) (the foregoing and other changes) in form and details may be made therein without departing from the spirit and scope of the invention.

Having thus described our invention, what we claim as new and desire to secure by Letters Patent is:

1. A system to provide on demand access to merchandise information related to a movie while said movie is being presented to a user, said movie having been generated from movie related information comprising said merchandise information, comprising:

index information maintaining means for maintaining index information identifying relationships between said movie and said movie related information, comprising means for maintaining a source table having a plurality of entries, each of said entries storing first information identifying one of a scene, clip, or take, second information identifying portions in said movie corresponding to said one of a scene, clip, or take, third information sufficient to locate movie related information related to said one of a scene, clip, or take, and fourth information identifying a scene in which said one of a scene, clip, or take appears;

movie presenting means for presenting said movie to said user;

query receiving means for receiving from said user a merchandise related query pertaining to said movie;

movie part determining means for determining, by reference to at least said source table, a part of said movie that was being presented to said user when said user issued said query;

movie related information identifying means for identifying, as specified by said query, portions of said movie related information relating to merchandise appealing in said part of said movie;

movie related information retrieving means for retrieving said portions of said movie related information; and movie related information presenting means for presenting to said user said retrieved portions of said movie related information.

2. A method of providing on demand access to merchandise information related to a movie while said movie is being presented to a user, said movie having been generated from movie related information comprising said merchandise information, comprising the steps of:

(1) maintaining index information identifying relationships between said movie and said movie related information, including the step of maintaining a source table having a plurality of entries, each of said entries storing first information identifying one of a scene, clip, or take, second information identifying portions in said movie corresponding to said one of a scene, clip, or take, third information sufficient to locate movie related information related to said one of a scene, clip, or take, and fourth information identifying a scene in which said one of a scene, clip, or take appears;

(2) presenting said movie to said user;

(3) receiving from said user a merchandise related query pertaining to said movie;

(4) determining, by reference to at least said source table, a part of said movie that was being presented to said user when said user issued said query;

(5) identifying, as specified by said query, portions of said movie related information relating to merchandise appearing in said part of said movie;

(6) retrieving said portions of said movie related information; and (7) presenting to said user said retrieved portions of said movie related information.

3. A computer program product comprising a computer readable medium having computer program logic recorded thereon for enabling a processor in a computer system to provide on demand access to merchandise information related to a movie, and for providing on demand connectivity to merchants, while said movie is being presented to a user, said movie having been generated from movie related information comprising said merchandise information, said computer program product comprising:

movie presenting means for enabling said processor to present said movie to said user;

query receiving means for enabling said processor to receive from said user a merchandise related query pertaining to said movie;

scene determining means for enabling said processor to determine a scene of said movie that was being presented to said user when said user issued said query;

movie related information identifying means for enabling said processor to identify, as specified by said query, portions of said movie related information relating to merchandise appearing in said scene;

movie related information retrieving means for enabling said processor to retrieve said portions of said movie related information;

movie related information presenting means for enabling said processor to present to said user said retrieved portions of said movie related information; and index information generating means for generating index information identifying relationships between said movie and said movie related information, comprising means for generating a source table having a plurality of entries, each of said entries storing first information identifying one of a scene, clip, or take, and second information sufficient to locate movie related information related to said one of a scene, clip, or take.

4. The computer program product of claim 3, wherein said movie presenting means comprises:

means for enabling said processor to present said movie to said user at a location and time specified by said user.

5. The computer program product of claim 3, wherein said scene determining means comprises:

means for enabling said processor to extract from said movie a time code of said frame that was being presented to said user when said user issued said query;

means for enabling said processor to compare said time code of said frame with said second information stored in entries of said source table to identify at least one entry of said source table relating to said frame; and means for enabling said processor to identify said scene that was being presented to said user when said user issued a query by reference to said second information stored in said at least one entry of said source table.

6. The computer program product of claim 5, wherein said index information generating means further comprises:

means for enabling said processor to generate merchandise related index information specifying merchandise appearing in each scene of said movie, and for enabling said processor to identify merchants who provided said merchandise.

7. The computer program product of claim 6, wherein said movie related information identifying means, movie related information retrieving means, and movie related information presenting means collectively comprise:

means for enabling said processor to access said merchandise related index information to identify information relating to merchandise appearing in said scene;

means for enabling said processor to retrieve said information relating to merchandise appearing in said scene; and means for enabling said processor to present to said user said retrieved information relating to merchandise appearing in said scene.

8. The computer program product of claim 7, further comprising:

means for enabling said processor to access said merchandise related index information to identify information pertaining to merchants who provided said merchandise appearing in said scene;

means for enabling said processor to retrieve said merchants identifying information; and means for enabling said processor to present to said user said retrieved merchants identifying information.

9. A program storage device readable by a machine, tangibly embodying a program of instructions executable by the machine to perform method steps for providing on demand access to merchandise information related to a movie, and for providing on demand connectivity to merchants while said movie is being presented to a user, said movie having been generated from movie related information comprising said merchandise information, said method steps comprising:

(1) generating index information identifying relationships between said movie and said movie related information, comprising the step of generating a source table having a plurality of entries, each of said entries storing first information identifying one of a scene, clip, or take, and second information sufficient to locate movie related information related to said one of a scene, clip, or take;

(2) presenting said movie to said user;

(3) receiving from said user a merchandise related query pertaining to said movie;

(4) determining a scene of said movie that was being presented to said user when said user issued said query;

(5) identifying, as specified by said query, portions of said movie related information relating to merchandise appearing in said scene;

(6) retrieving said portions of said movie related information; and (7) presenting to said user said retrieved portions of said movie related information.

10. The program storage device of claim 9, wherein step (2) comprises the step of:

presenting said movie to said user at a location and time specified by said user.

11. The program storage device of claim 9, wherein step (4) comprises the steps of:

extracting from said movie a time code of said frame that was being presented to said user when said user issued said query;

comparing said time code of said frame with said second information stored in entries of said source table to identify at least one entry of said source table relating to said frame; and identifying said scene that was being presented to said user when said user issued said query by reference to said fourth information stored in said at least one entry of said source table.

12. The program storage device of claim 11, wherein step (1) further comprises the steps of:

generating merchandise related index information specifying merchandise appearing in each scene of said movie, and identifying merchants who provided said merchandise.

13. The program storage device of claim 12, wherein step (5) comprises the steps of:

accessing said merchandise related index information to identify information relating to merchandise appearing in said scene.

14. The program storage device of claim 12, wherein step (6) comprises the step of:

retrieving said information relating to merchandise appearing in said scene.

15. The program storage device of claim 12, wherein step (7) comprises the step of:

presenting to said user said retrieved information relating to merchandise appearing in said scene.

16. The program storage device of claim 9, further comprising the steps of:

(8) accessing said merchandise related index information to identify information pertaining to merchants who provided said merchandise appearing in said scene;

(9) retrieving said merchants identifying information; and

(10) presenting to said user said retrieved merchants identifying information.

17. The program storage device of claim 16, further comprising the step of:

(11) enabling said user to interact with any of said merchants who provided said merchandise appearing in said scene in response to a request from said user to do so.

18. A computer program product comprising a computer readable medium having computer program logic recorded thereon for enabling a processor in a computer system to provide on demand access to merchandise information related to a movie, and for providing on demand connectivity to merchants, while said movie is being presented to a user, said movie having been generated from movie related information comprising said merchandise information, said computer program product comprising:

movie presenting means for enabling said processor to present said movie to said user;

query receiving means for enabling said processor to receive from said user a merchandise related query pertaining to said movie;

scene determining means for enabling said processor to determine a scene of said movie that was being presented to said user when said user issued said query;

movie related information identifying means for enabling said processor to identify, as specified by said query, portions of said movie related information relating to merchandise appearing in said scene;

movie related information retrieving means for enabling said processor to retrieve said portions of said movie related information;

movie related information presenting means for enabling said processor to present to said user said retrieved portions of said movie related information; and index information generating means for enabling said processor to generate index information identifying relationships between said movie and said movie related information, comprising means for generating a source table having a plurality of entries, each of said entries storing first information identifying one of a scene, clip, or take, second information identifying portions in said movie corresponding to said one of a scene, clip, or take, third information sufficient to locate movie related information related to said one of a scene, clip, or take, and fourth information identifying a scene in which said one of a scene, clip, or take appears.

19. The computer program product of claim 18, wherein said movie presenting means comprises:

means for enabling said processor to present said movie to said user at a location and time specified by said user.

20. The computer program product of claim 18, wherein said scene determining means comprises:

means for enabling said processor to extract from said movie a time code of said frame that was being presented to said user when said user issued said query;

means for enabling said processor to compare said time code of said frame with said second information stored in entries of said source table to identify at least one entry of said source table relating to said frame; and means for enabling said processor to identify said scene that was being presented to said user when said user issued said query by reference to said fourth information stored in said at least one entry of said source table.

21. The computer program product of claim 20, wherein said index information generating means further comprises:

means for enabling said processor to generate merchandise related index information specifying merchandise appearing in each scene of said movie, and for enabling said processor to identify merchants who provided said merchandise.

22. The computer program product of claim 21, wherein said movie related information identifying means, movie related information retrieving means, and movie related information presenting means collectively comprise:

means for enabling said processor to access said merchandise related index information to identify information relating to merchandise appearing in said scene;

means for enabling said processor to retrieve said information relating to merchandise appearing in said scene; and means for enabling said processor to present to said user said retrieved information relating to merchandise appearing in said scene.

23. The computer program product of claim 22, further comprising:

means for enabling said processor to access said merchandise related index information to identify information pertaining to merchants who provided said merchandise appearing in said scene;

means for enabling said processor to retrieve said merchants identifying information; and means for enabling said processor to present to said user said retrieved merchants identifying information.

24. The computer program product of claim 23, further comprising:

means for enabling said processor to enable said user to interact with any of said merchants who provided said merchandise appearing in said scene in response to a request from said user to do so.

25. A program storage device readable by a machine, tangibly embodying a program of instructions executable by the machine to perform method steps for providing on demand access to merchandise information related to a movie, and for providing on demand connectivity to merchants while said movie is being presented to a user, said movie having been generated from movie related information comprising said merchandise information, said method steps comprising:

(1) generating index information identifying relationships between said movie and said movie related information, comprising the step of generating a source table having a plurality of entries, each of said entries storing first information identifying one of a scene, clip, or take, second information identifying portions in said movie corresponding to said one of a scene, clip, or take, third information sufficient to locate movie related information related to said one of a scene, clip, or take, and fourth information identifying a scene in which said one of a scene, clip, or take appears;

(2) presenting said movie to said user;

(3) receiving from said user a merchandise related query pertaining to said movie;

(4) determining a scene of said movie that was being presented to said user when said user issued said query;

(5) identifying, as specified by said query, portions of said movie related information relating to merchandise appearing in said scene;

(6) retrieving said portions of said movie related information; and (7) presenting to said user said retrieved portions of said movie related information.

26. The program storage device of claim 25, wherein step (2) comprises the step of:

presenting said movie to said user at a location and time specified by said user.

27. The program storage device of claim 25, wherein step (4) comprises the steps of:

extracting from said movie a time code of said frame that was being presented to said user when said user issued said query;

comparing said time code of said frame with said second information stored in entries of said source table to identify at least one entry of said source table relating to said frame; and identifying said scene that was being presented to said user when said user issued said query by reference to said fourth information stored in said at least one entry of said source table.

28. The program storage device of claim 27, wherein step (1) further comprises the steps of:

generating merchandise related index information specifying merchandise appearing in each scene of said movie, and identifying merchants who provided said merchandise.

29. The program storage device of claim 28, wherein steps (5), (6), and (7) collectively comprise the steps of:

accessing said merchandise related index information to identify information relating to merchandise appearing in said scene;

retrieving said information relating to merchandise appearing in said scene; and presenting to said user said retrieved information relating to merchandise appearing in said scene.

30. The program storage device of claim 29, further comprising the steps of:

(8) accessing said merchandise related index information to identify information pertaining to merchants who provided said merchandise appearing in said scene;

(9) retrieving said merchants identifying information; and

(10) presenting to said user said retrieved merchants identifying information.

31. The program storage device of claim 30, further comprising the step of:

(11) enabling said user to interact with any of said merchants who provided said merchandise appearing in said scene in response to a request from said user to do so.

32. A computer program product comprising a computer useable medium having computer program logic recorded thereon for enabling a processor in a computer system to provide on demand access to merchandise information related to a movie while said movie is being presented to a user, said movie having been generated from movie related information comprising said merchandise information, said computer program product comprising:

index information maintaining means for enabling said processor to maintain index information identifying relationships between said movie and said movie related information, comprising means for enabling said processor to maintain a source table having a plurality of entries, each of said entries storing first information identifying one of a scene, clip, or take, second information identifying potions in said movie corresponding to said one of a scene, clip, or take, third information sufficient to locate movie related information related to said one of a scene, clip, or take, and fourth information identifying a scene in which said one of a scene, clip, or take appears;

movie presenting means for enabling said processor to present said movie to said user;

query receiving means for enabling said processor to receive from said user a merchandise related query pertaining to said movie;

movie part determining means for enabling said processor to determine, by reference to at least said source table, a part of said movie that was being presented to said user when said user issued said query;

movie related information identifying means for enabling said processor to identify, as specified by said query, portions of said movie related information relating to merchandise appearing in said part of said movie;

movie related information retrieving means for enabling said processor to retrieve said portions of said movie related information; and movie related information presenting means for enabling said processor to present to said user said retrieved portions of said movie related information.

33. The computer program product of claim 32, wherein said movie presenting means includes means for enabling said processor to present said movie to said user at a location and time specified by said user.

34. The computer program product of claim 32, wherein said movie part determining means comprises:

means for enabling said processor to extract from said movie a time code of said frame that was being presented to said user when said user issued said query;

means for enabling said processor to compare said time code of said frame with said second information stored in entries of said source table to identify at least one entry of said source table relating to said frame; and means for enabling said processor to identify said scene that was being presented to said user when said user issued said query by reference to said fourth information stored in said at least one entry of said source table.

35. The computer program product of claim 32, wherein said index information maintaining means further comprises:

means for enabling said processor to maintain merchandise related index information specifying merchandise appearing in each scene of said movie, and identifying merchants who provided said merchandise.

36. The computer program product of claim 35, wherein said movie related information identifying means, said movie related information retrieving means, and said movie related information presenting means collectively comprise:

means for enabling said processor to access said merchandise related index information to identify information relating to merchandise appearing in said scene;

means for enabling said processor to retrieve said information relating to merchandise appearing in said scene; and means for enabling said processor to present to said user said retrieved information relating to merchandise appearing in said scene.

37. The computer program product of claim 36, wherein said computer program logic further comprises:

means for enabling said processor to access said merchandise related index information to identify information pertaining to merchants who provided said merchandise appearing in said scene;

means for enabling said processor to retrieve said merchants identifying information; and means for enabling said processor to present to said user said retrieved merchants identifying information.

38. The computer program product of claim 37, wherein said computer program logic further comprises:

means for enabling said processor to enable said user to interact with any of said merchants who provided said merchandise appearing in said scene in response to a request from said user to do so.

* * * * *